US011857987B1

United States Patent
Stolarz et al.

(10) Patent No.: US 11,857,987 B1
(45) Date of Patent: Jan. 2, 2024

(54) SYSTEMS AND METHOD FOR PAINTING USING DRONES

(71) Applicant: RobotArmy, Inc., Los Angeles, CA (US)

(72) Inventors: Damien Stolarz, Los Angeles, CA (US); Zack Gainsforth, Los Angeles, CA (US); David Diaz, Clearwater, FL (US)

(73) Assignee: RobotArmy, Inc., Los Angeles, CA (US)

( * ) Notice: Subject to any disclaimer, the term of this patent is extended or adjusted under 35 U.S.C. 154(b) by 372 days.

(21) Appl. No.: 16/810,817

(22) Filed: Mar. 5, 2020

Related U.S. Application Data

(60) Provisional application No. 62/823,376, filed on Mar. 25, 2019.

(51) Int. Cl.
| | |
|---|---|
| *B64D 47/08* | (2006.01) |
| *B64U 10/13* | (2023.01) |
| *B64U 101/00* | (2023.01) |
| *B64U 101/30* | (2023.01) |
| *B05B 12/12* | (2006.01) |
| *B05B 13/00* | (2006.01) |
| *B64C 39/02* | (2023.01) |

(52) U.S. Cl.
CPC .......... *B05B 12/122* (2013.01); *B05B 13/005* (2013.01); *B64C 39/022* (2013.01); *B64C 39/024* (2013.01); *B64D 47/08* (2013.01); *B64U 10/13* (2023.01); *B64U 2101/00* (2023.01); *B64U 2101/30* (2023.01); *B64U 2201/202* (2023.01)

(58) Field of Classification Search
CPC ... B05B 12/122; B05B 13/005; B64C 39/022; B64C 39/024; B64C 2201/027; B64C 2201/12; B64C 2201/127; B64C 2201/148; B64D 47/08
See application file for complete search history.

(56) References Cited

U.S. PATENT DOCUMENTS

| | | | |
|---|---|---|---|
| 11,055,797 B1 * | 7/2021 | Carone | H04L 67/12 |
| 2015/0344136 A1 * | 12/2015 | Dahlstrom | B05B 13/005 239/722 |
| 2018/0028364 A1 * | 2/2018 | Erickson | A61F 5/05841 |
| 2018/0155025 A1 * | 6/2018 | Osterhout | G05D 1/0038 |
| 2018/0343847 A1 * | 12/2018 | Ervin | A01M 1/226 |
| 2019/0138168 A1 * | 5/2019 | Vickers | G06F 3/04845 |
| 2019/0247877 A1 * | 8/2019 | Fideler | B05B 13/005 |
| 2019/0248485 A1 * | 8/2019 | Ulaganathan | G05D 1/101 |
| 2020/0207488 A1 * | 7/2020 | Troy | B64F 5/60 |

FOREIGN PATENT DOCUMENTS

WO    WO-2016156774 A1 * 10/2016 ........... B05B 12/004

* cited by examiner

*Primary Examiner* — Anne Marie Antonucci
*Assistant Examiner* — Jingli Wang
(74) *Attorney, Agent, or Firm* — Clause Eight; Michael Catania

(57) ABSTRACT

A method and system for performing painting using an unmanned aerial vehicle is disclosed herein. The system comprises an unmanned aerial vehicle and a user computing device. The unmanned aerial vehicle comprises a plurality of nozzles, at least one camera, at least one sensor, at least one software module, a plurality of paint containers, lidar, and a plurality of blades.

11 Claims, 23 Drawing Sheets

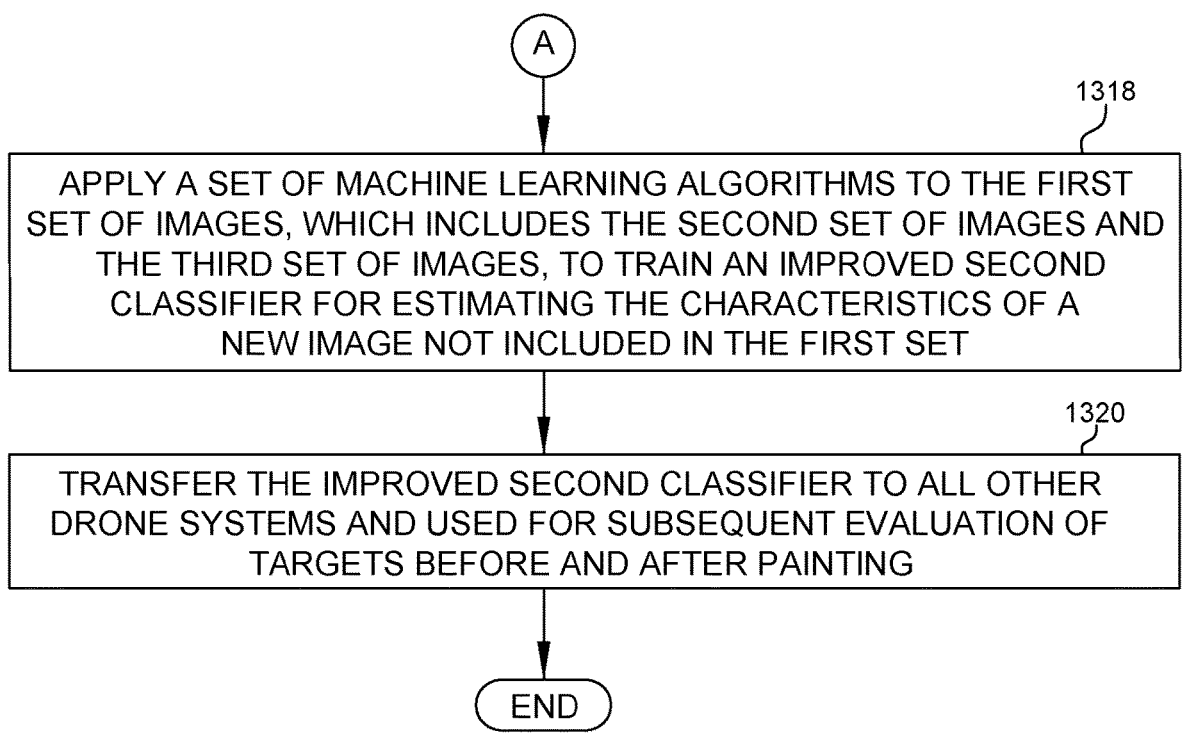
FIG. 13 (Continue)

SYSTEMS AND METHOD FOR PAINTING USING DRONES

CROSS REFERENCE TO RELATED APPLICATION

The Present Application claims priority to U.S. Provisional Patent Application No. 62/823,376, filed on Mar. 25, 2019, which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The presently disclosed embodiments are related, in general, to performing painting. More particularly, the presently disclosed embodiments are related to methods and systems for performing painting using drones, autonomous vehicles, and a vehicle deploying the drones.

Description of the Related Art

Coating or painting interiors and exteriors of structures is done to preserve and maintain the aesthetics of the structures. However, the painting of the interior and exterior structures is a tedious and time-consuming task. Further, the painting of the exterior of the structures may be a dangerous task. One or more materials are required to paint interior walls. The one or more materials include painter's tape, drop cloths, paint containers, paintbrushes, rollers, sprayers, primer, and lacquer.

Further, a painter carries around a paint can or a small container of paint and slowly paints the edges—top, side, intermediate, and bottom—of the wall. Further, the painter paints ("cuts in") the edges of the wall with particular care to avoid painting the ceiling, floor, and/or door frames. Further, the painter performs such cutting by hand with a small brush. Further, the cutting requires the painter to spend significant amounts of time bent over, standing on ladders, and moving painting equipment along the wall. Such cutting occupies at least half the time spent painting a single surface.

Further, the painter uses paint rollers that may be attached to a long handle. The paint rollers enable the painter to apply a coat of paint to a large area of a wall with minimal effort. However, such painting requires many tools, which increases the cost. Further, once a first coat of paint is applied to a surface being painted, the painter waits for the previous coat of paint to dry, resets the equipment for the next coat, and begins the process again. Such waiting time between coats is problematic. Further, the painter wants to complete the job as quickly as possible but may be unfamiliar with the minimum amount of time necessary to wait between coats. The wait time is heavily influenced by environmental factors such as ambient temperature and humidity. Further, many painters may not apply a coat of paint to an exterior surface of a structure if the weather forecast calls for rain within twelve hours.

Unmanned aerial vehicles (UAV) and robotic devices have been used to perform a variety of complex tasks. For example, consumer-oriented drones allow operators to wirelessly control and fly a small unmanned aerial vehicle via a smartphone or a tablet. These consumer-oriented drones often include onboard systems that receive wireless signals from the user and perform semi-autonomous tasks, such as taking pictures, flying a pre-programmed pattern, and/or landing. In another example, some drones are capable of flying precise flight patterns, identifying and avoiding obstacles in a flight path, picking up objects, and taking off or landing at a desired location. Some robotic devices are suited to perform basic, tedious, and/or time-consuming tasks. For example, a robotic cleaning device is used to eliminate or reduce the need for an individual to clean the floor frequently. However, such drones require user control, operation, and command to perform tasks.

Therefore, there is a need for an improved method and system for performing painting using drones and autonomous vehicles—one that is efficient, accurate, reliable, autonomous, easy to use, reduces or eliminates the human labor involved in painting a surface, and reduces time to paint the surface.

BRIEF SUMMARY OF THE INVENTION

One aspect of the present invention is a system for performing painting using an unmanned aerial vehicle. The system comprises an unmanned aerial vehicle and a user computing device. The unmanned aerial vehicle comprising a plurality of nozzles, at least one camera, at least one sensor, at least one software module, a plurality of paint containers, lidar, and a plurality of blades. The at least one sensor is preferably one of an infrared sensor, an ultraviolet sensor, a speed and distance sensor, an image sensor, a bump map sensor, a chemical sensor or a spectroscopic sensor. The at least one software module is preferably one of a physics-based soft module for modeling of light interactions, a visual software module, a machine learning module, a module to separate various paint layers, a module to predict a mixture of thin colors, a module to monitor the usage of equipment, or a module for remote control.

The unmanned aerial vehicle also preferably comprises a CPU, a memory, a machine learning unit, a TPU, a transceiver, a comparator and an image capturing device.

Another aspect of the present invention is a method for performing painting using an unmanned aerial vehicle (UAV). The method includes performing an analysis of a structure using the UAV to capture a plurality of images of the structure and a plurality of measurements of the structure, the UAV comprising a plurality of nozzles, at least one camera, at least one sensor, at least one software module, a plurality of paint containers, and a plurality of blades. The method also includes laying a plurality of beacons by the UAV. The method also includes receiving a plurality of commands at the UAV. The method also includes generating a painting boundary by the UAV. The method also includes preparing the structure for painting by the UAV. The method also includes painting the structure by the UAV to create a painted structure. The method also includes analyzing the painted structure by the UAV.

The method also includes applying a protective coating to the painted structure by the UAV.

Yet another aspect of the present invention is a method for performing painting using an unmanned aerial vehicle (UAV) and improving the results using machine learning. The method includes capturing a first plurality of images from a plurality of painted targets and a plurality of unpainted targets. The method also includes applying a plurality of machine learning algorithms to the first plurality of images to a train a first classifier. The method also includes capturing a second plurality of images from a current target, the second plurality of images captured under a variety of conditions. The method also includes applying the first classifier to the second plurality of images to determine a current condition of the current target with respect to painting. The method also includes painting the current target using an UAV to create a painted target, the UAV comprising a plurality of nozzles, at least one camera, at least one sensor, at least one software module, a lidar, a plurality of paint containers, and a plurality of blades. The method also includes capturing a third plurality of images of the painted target. The method also includes judging the painted target from the third plurality of images. The method also includes generating an improved UAV control algorithm for painting. The method also includes training a second classifier from the first plurality of images, the second plurality of images and the third plurality of images.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
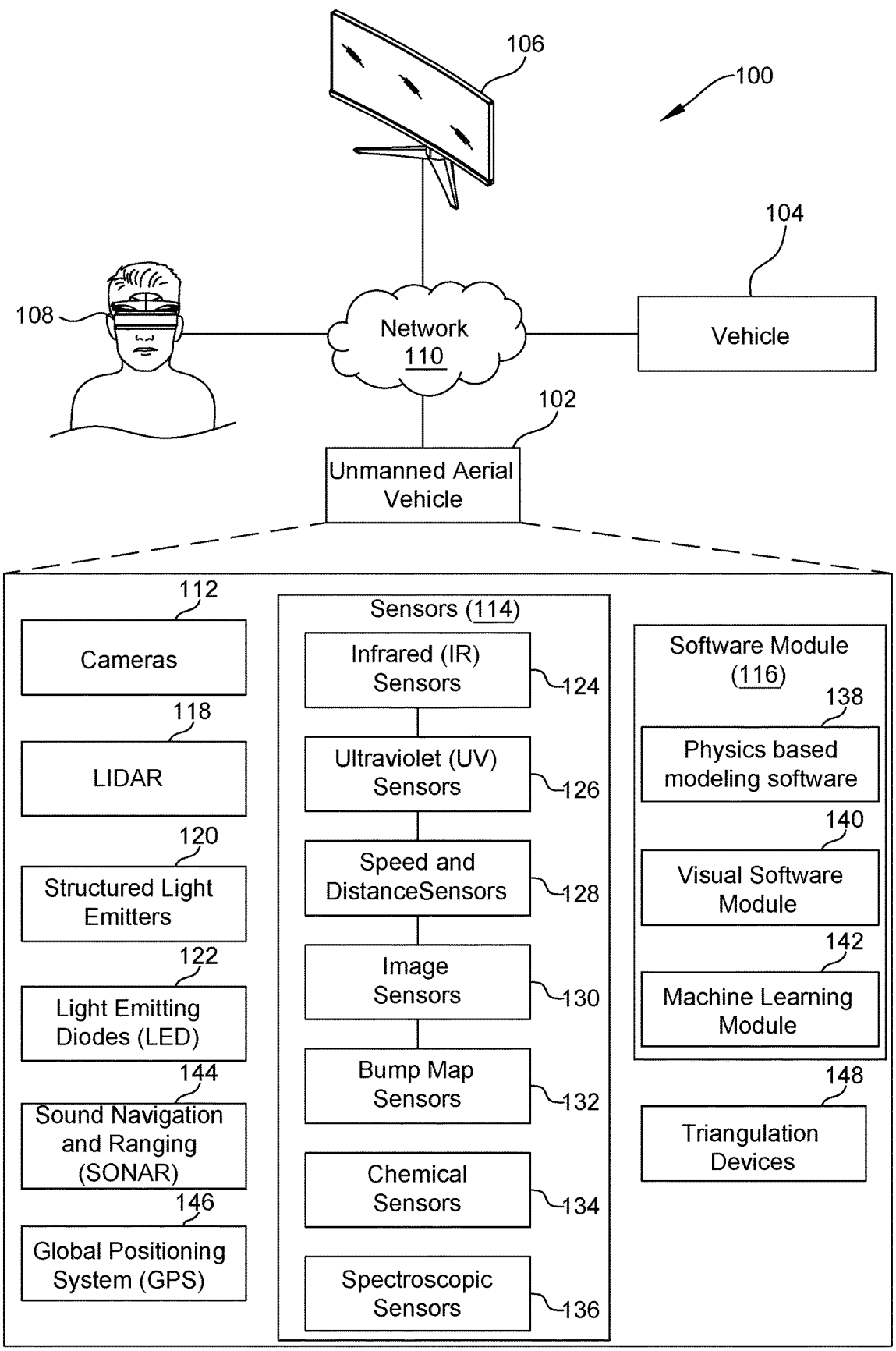
FIG. 1 illustrates a block diagram showing a system environment in which various embodiments may be implemented.

FIG. 1 illustrates a block diagram showing a system environment 100 in which various embodiments may be implemented. The system environment 100 may include an unmanned aerial vehicle 102, a vehicle 104, a user computing device 106, wearable glasses 108 worn by a user, and a network 110. The unmanned aerial vehicle 102 may include one or more cameras 112, one or more sensors 114, one or more software modules 116, lidar 118, structured light emitters 120, and light-emitting diodes (LEDs) 122. Various components in the system environment 100 may be interconnected over the network 110. Hereinafter, the unmanned aerial vehicle 102 may be referred to as a drone.

The drone 102 may be used to paint buildings, walls, houses, and other targets. In one embodiment, the drone 102 may be used for scanning and replicating murals in an urban area. In another embodiment, the drone 102 may be used for cleaning the area. In another embodiment, the drone 102 is remotely controlled by a painter to paint a house. In another embodiment, the drone 102 may be used for security. The drone 102 is preferably used for roller-based, spray-based, paintbrush, and other types of painting. The drone 102 may include the one or more cameras 112 for capturing images while performing the operations such as painting and cleaning. The images may correspond to high resolution photographs and/or panoramic images. In one case, when the drone 102 is used for cleaning purposes, it may capture images before and after cleaning to ensure that the cleaning achieves the desired results without damage. It should be noted that the one or more cameras 112 may be light field cameras (i.e., plenoptic cameras), tracking cameras, wide-angle cameras, and/or 360-degree cameras. In one case, the drone 102 may use a thermal camera (not shown) as well, without departing from the scope of the disclosure.

The drone 102 may include the one or more sensors 114 to sense data related to the various operations, such as painting and cleaning, performed by the drone 102. In one embodiment, the data corresponds to images indicating the roughness of a surface, such as that of a building, wall, or house. The one or more sensors 114 include infrared (IR) sensors 124, ultraviolet (UV) sensors 126, speed and distance sensors 128, image sensors 130, bump map sensors 132, chemical sensors 134, and spectroscopic sensors 136. The IR sensors 124 may be used by the drone 102 to determine how "wet" the paint is. Further, the IR sensors 124 may be used for search and surveillance operations. The UV sensors 126 may be used to detect how dry the paint is and other aspects of the image captured by the one or more cameras 112. The speed and distance sensors 128 may be used to detect the speed of the drone 102 and measure the distance between the drone 102 and another object, without actual physical contact with the object. The image sensors 130 may be used to detect and convey information about what constitutes an image. The image sensors 130 may be used along with the one or more cameras 112 to create digital images.

The bump map sensors 132 may be used to determine texture, roughness and curvature of a surface, such as that of a building, wall, or house. Further, the bump map sensors 132 may identify surfaces that should be sanded. In one embodiment, the drone 102 may sand automatically based on the identification of the surface. The chemical sensors 134 may be used to sense chemical composition. In one embodiment, the chemical sensors 134 may be used to detect chemicals present in environmental, industrial and emergency response situations.

The spectroscopic sensors 136 may be used to more deeply analyze paint composition and application. A spectrographic image includes information in non-visible spectra, including IR and UV. A spectrographic image of the painting target can reveal information that is not visible in a normal photograph, such as dirt, damage, paint defects, uneven application, et al. The drone 102 may use its spectroscopic sensors 136 to record a spectroscopic image of the target before and/or after painting for any of a number of purposes, including, but not limited to, detecting dirt or damage, verifying paint application and consistency, and measuring paint mixture and curing properties.

Further, the drone 102 may include the one or more software modules 116 for processing the data captured by the one or more cameras 112 and the one or more sensors 114. The one or more software modules 116 may include physics-based software 138 for modeling of light interactions. Further, the one or more software modules 116 may include a visual software module 140 for determining whether recorded images look correct. Further, the one or more software modules 116 may include a machine learning module 142 for finding objects and/or regions to paint. Further, the one or more software modules 116 may include various other software to determine one or more things. The one or more things may include, but are not limited to, paint colors that are suited for the surface, what color the paint will have when cured, how long the paint has been drying, creation of a three-dimensional (3D) map, and whether coverage is correct or another coat is needed. Further, the one or more software modules 116 may include software to separate various layers of painting and create an additive layered painting plan, to make layers when a set of spot paints are used, or to predict a mixture of two thin colors and a result of the mixture of the two colors. In one case, the spot paints may be of specific colors. As an example, the color may be specified using the CMYK color model.

Further, the one or more software modules 116 include software for remotely controlling painting apparatus with the user computing device 106 and artificial intelligence (AI). Further, the one or more software modules 116 include software to monitor the usage of equipment, such as paintbrush, roller, and/or sprayer. Further, the one or more software modules 116 may include software to alert a rental facility in case of a fault. Further, the one or more software modules 116 include software to order delivery of paint refills if the user runs out, and to support the user who is using more than one drone 102 to quickly paint the target. It will be apparent to one skilled in the art that the above-mentioned software has been provided only for illustration purposes. In one embodiment, the drone 102 may be integrated with some other software as well, without departing from the scope of the disclosure.

In one embodiment, the drone 102 may be integrated with the lidar 118 to test surface anomalies detected by the one or more sensors 114. In one case, the bump map sensors 132 may detect roughness of the surface, and then the lidar 118 may test the surface anomalies. Further, the drone 102 may be integrated with the structured light emitters 120 to test surface deformities. Further, the drone 102 may be integrated with LEDs 122 of various frequencies to test whether the painting was executed correctly. In one case, the LEDs 122 may correspond to localized LEDs for consistently preserving the color. In one embodiment, localized, focused light may be used to view an area being worked on without variation by ambient light or darkness.

In one embodiment, the drone 102 is integrated with backup spray nozzles (not shown). The backup spray nozzles are used when the drone 102 detects clogging in the nozzle. Further, the drone 102 may integrated with one or more physical rollers to detect surface anomalies. In one embodiment, the drone 102 may be integrated with a liquid collection system (not shown). The liquid collection system may have a vacuum hose and a filter at the end of the hose. The liquid collection system may be used for storing fluid that is being supplied through the hose to the drone 102 for various operations, such as cleaning and washing the area or dust debris created by the sanding. In one embodiment, the drone 102 may be integrated with a paint supply system (not shown) for supplying paints to the drone 102. The paint supply system may include one or more containers being filled with different types of paint. The different types of paint may include, but are not limited to, latex-based paint, water-based paint, stucco paint, and oil-based paint. Thereafter, the drone 102 may receive the paint through the paint supply system for painting the target. In one embodiment, the drone 102 may be integrated with a sanding attachment. In one embodiment, the system 100 may use six degrees of freedom (6DoF) for capturing data such as images in free space.

It should be noted that a mechanical and an actuation method may be used to fully control the drone 102 with six or more degrees of freedom. In one embodiment, a full directional authority may be enabled on each individual thrust vector by introducing two additional degrees of freedom (twist and tilt) to each rotor. Further, a resulting system may possess omnidirectional thrust-vectoring capabilities, fully decouple the position and attitude dynamics, and minimize wasted thrust over its entire configuration space. Such features may allow the drone 102 to assume any arbitrary body orientation and thus to angle itself with respect to a work surface for the purpose of physical interaction, without departing from the scope of the disclosure.

In one embodiment, the drone 102 may be integrated with Sound Navigation and Ranging (SONAR) 144 that uses sound propagation to navigate, communicate, and/or detect objects. Further, the SONAR 144 may be used to aid in an indoor "altitude hold" mode and/or for checking distance from a wall. Further, the drone 102 may be integrated with Global Positioning System (GPS) 146 and triangulation devices 148. The GPS 146 may be used for tracking the location of the drone 102. Further, the triangulation devices 148 may be used to capture data related to one or more activities of the drone 102.

It will be apparent to one skilled in the art that the above-mentioned components of the drone 102 have been provided only for illustration purposes. In one embodiment, the drone 102 may be integrated with laser as well, without departing from the scope of the disclosure. The drone 102 may be, but is not limited to, a flying quadcopter tethered to a hose and a rolling floor system, a quadcopter tethered to van, a drone with feet, a robotic arm coming out of a vehicle, or a robotic arm coming out of a ground rolling system, where the robotic arm is connected to a painting system. It should be noted that some other types of drone may be used for painting, scanning, and replicating murals in an urban area, without departing from the scope of the disclosure.

The vehicle 104 may be used for cleaning an urban area. It should be noted that the vehicle 104 may correspond to an autonomous vehicle. In one embodiment, the vehicle 104 may capture images of the urban area. In one case, the images may correspond to dirt and garbage images. Successively, the vehicle 104 may catalog the images. Successively, the vehicle 104 may send the captured images to a remote station (not shown) where they are compared with stored images. Based at least on the comparison, the vehicle 104 may receive a command for cleaning the area. In one case, the command may be received from the remote station or from the user. Thereafter, the vehicle 104 may apply the paint in order to preserve and maintain the aesthetics of the urban area. In one case, the vehicle 104 may be a street sweeper. In another case, the vehicle 104 may be a three-wheeler or four-wheeler, without departing from the scope of the disclosure.

The user computing device 106 is preferably used by the user for remotely controlling and guiding the drone 102. In one case, the user may correspond to a painter. In one embodiment, the user may zoom in to an area using the user computing device 106. For example, the user may identify an area where the paint needs to be done using a sprayer. Based at least on the identification, the user may give precise directions to the drone 102. In one case, the directions may include slowly painting with the sprayer, roller, or paintbrush. In another case, the directions may include cleaning and sanding areas. In one embodiment, a mobile application running on the user computing device 106 may allow the user to order more paint if needed. Such functioning of the drone 102 eliminates the need of the user to mask to avoid overspray. The user computing device 106 may be realized through a variety of computing devices, such as a desktop, a computer server, a laptop, a mobile phone, a personal digital assistant (PDA), or a tablet computer.

In one embodiment, the user may wear the wearable glasses 108 to monitor the area painted by the drone 102. Further, the user wearing the wearable glasses 108 may look and see previews of how the house will look with different colors and patterns. Further, the use of the wearable glasses 108 may allow the user to see an overlay aligned with the target showing areas that need to be sanded or masked. Further, the user may remotely view, zoomed in, what is being painting and may operate the drone 102 for areas that are hard to reach. In one embodiment, a virtual reality (VR) device may be used by the remote painter to do the motions of painting the house, the motions of the painter turning into paint strokes.

The network 110 corresponds to a medium through which content and data flow between various components of the system environment 100 (i.e., the unmanned aerial vehicle 102, the vehicle 104, the user computing device 106, and the wearable glasses 108 worn by the user). Examples of the network 110 may include, but are not limited to, a Wi-Fi network, a Bluetooth mesh network, a wide area network (WAN), a local area network (LAN), or a metropolitan area network (MAN). Various devices in the system environment 100 may connect to the network 110 in accordance with various wired and wireless communication protocols, such as Transmission Control Protocol over Internet Protocol (TCP/IP), User Datagram Protocol (UDP), and 2G, 3G, or 4G communication protocols. In some embodiments, the network 110 may be a cloud network or cloud-based network.

Figure 2:
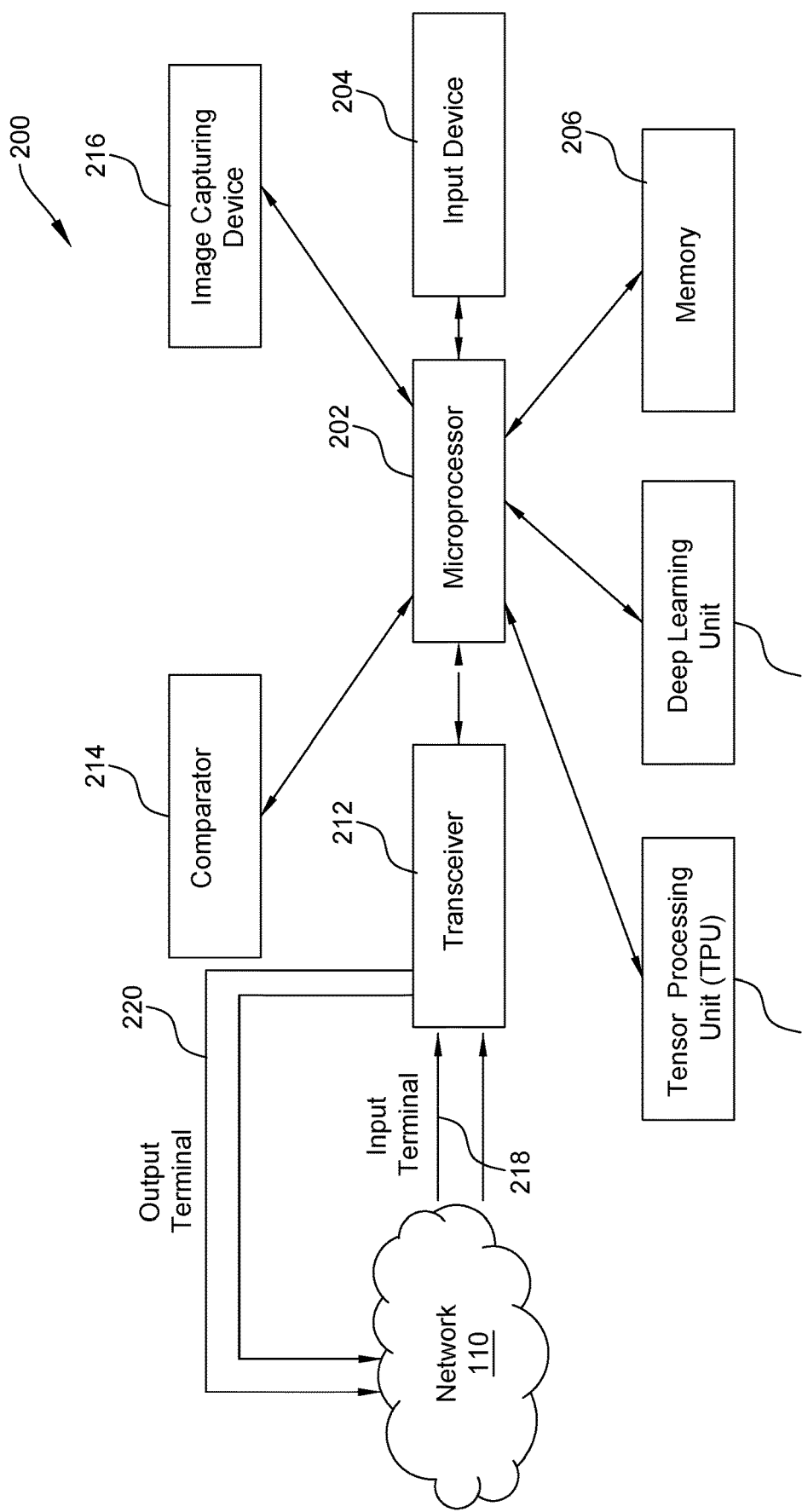
FIG. 2 is a block diagram illustrating a system in accordance with at least one embodiment.

FIG. 2 is a block diagram illustrating a system 200, in accordance with at least one embodiment. The system 200 may be considered as the drone 102 and/or the vehicle 104. For the purpose of ongoing description, the system 200 has been considered to be the drone 102.

The drone 102 includes a microprocessor 202, an input device 204, a memory 206, a machine learning unit 208, a tensor processing unit (TPU) 210, a transceiver 212, a comparator 214, and an image capturing device 216. The microprocessor 202 is coupled to the input device 204, the memory 206, the machine learning unit 208, the TPU 210, the transceiver 212, the comparator 214, and the image capture device 216. The transceiver 212 may connect to the network 110 through the input terminal 218 and the output terminal 220.

The microprocessor 202 includes suitable logic, circuitry, and/or interfaces that are operable to execute one or more instructions stored in the memory 206 to perform predetermined operations such as painting and cleaning. The microprocessor 202 may be implemented using one or more microprocessor technologies known in the art. Examples of the microprocessor 202 include, but are not limited to, an x86 microprocessor, an ARM microprocessor, a reduced instruction set computer (RISC) microprocessor, a complex instruction set computer (CISC) microprocessor, an application-specific integrated circuit (ASIC), or any other microprocessor.

The input device 204 may comprise suitable logic, circuitry, interfaces, and/or code that may be operable to receive an input from the user. The input may correspond to one or more commands of the user. The commands may include, but are not limited to, painting a particular building using oil paint, latex paint, and/or performing spray-painting on a particular area of the building. The input device 204 may be operable to communicate with the microprocessor 202. It will be apparent to a person skilled in the art that the input device 204 may be a part of the vehicle 104. In such a scenario, the input device 204 may receive a command such as cleaning the area and applying paint. Examples of the input device 204 may include, but are not limited to, a touch screen, a keyboard, a mouse, a joystick, a microphone, a camera, a motion sensor, a light sensor, and/or a docking station.

The memory 206 stores a set of instructions and data. Some of the commonly known memory implementations include, but are not limited to, a random access memory (RAM), a read-only memory (ROM), a hard disk drive (HDD), and a secure digital (SD) card. Further, the memory 206 includes the one or more instructions that are executable by the microprocessor 202 to perform specific operations. It will be apparent to a person with ordinary skill in the art that the one or more instructions stored in the memory 206 enable the hardware of the system 200 to perform the predetermined operations.

The machine learning unit 208 may be used to find regions to paint. In one example, the drone 102 may utilize the machine learning unit 208 to find and paint the edges of a wall. The machine learning unit 208 may use any number of machine learning or artificial intelligence technologies to achieve its purposes, including, but not limited to, neural networks, convolutional neural networks, supervised learning, unsupervised learning, reinforcement learning, and deep learning. Further, the TPU 210 may be an artificial intelligence (AI) accelerator application-specific integrated circuit (ASIC). The TPU 210 may be used for neural network machine learning.

The transceiver 212 transmits and receives messages and data to or from various components of the system environment 100 (e.g., the vehicle 104 and the user computing device 106) over the network 110. In some embodiments, the transceiver 212 is coupled to the input terminal 218 and the output terminal 220 through which the transceiver 212 may receive and transmit data/messages, respectively. Examples of the input terminal 218 and the output terminal 220 include, but are not limited to, an antenna, an Ethernet port, a USB port, or any other port that can be configured to receive and transmit data. The transceiver 212 transmits and receives data/messages in accordance with the various communication protocols—such as TCP/IP, UDP, and 2G, 3G, or 4G communication protocols—through the input terminal 218 and the output terminal 220.

The comparator 214 may be configured to compare the images taken before and after the cleaning to ensure that cleaning achieves the desired results without damage. Further, the comparator 214 may be configured to detect the difference between dirt and the image itself through a particle detection or obstacle detection technique. In one embodiment, the comparator 214 may be realized through either software technologies or hardware technologies known in the art. Though the comparator 214 is shown outside the microprocessor 202 in FIG. 2, a person skilled in the art would appreciate that the comparator 214 may be implemented inside the microprocessor 202 without departing from the scope of the disclosure.

The image capture device 216 may be configured to capture the images of the operations performed by the drone 102. It should be noted that the images may be captured before and after the painting operations. In some embodiments, the image capture device 216 may include a camera (not shown) that may be integrated into the drone 102. It will be apparent to a person skilled in the art that the image capture device 216 may be a part of the vehicle 104. In such a scenario, the image capture device 216 may capture images before and after cleaning to preserve and maintain the aesthetics of the urban area. The image capture device 216 may be implemented using one or more image sensing technologies known in the art, such as, but not limited to, a charge-coupled device (CCD) image sensor and a complementary metal oxide semiconductor (CMOS) image sensor.

Figure 3:
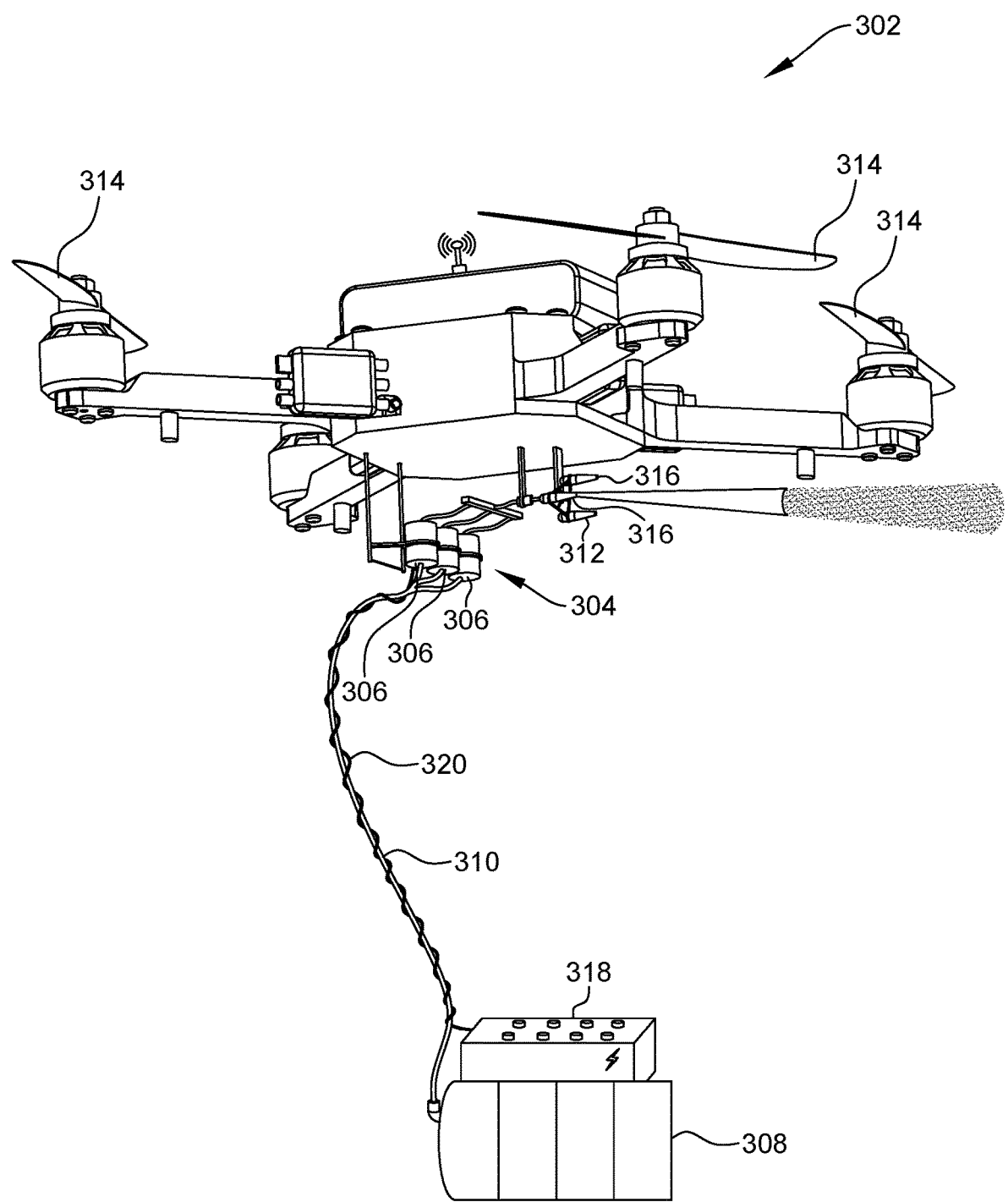
FIG. 3 illustrates a drone 302 having an on-board painting system 304, in accordance with at least one embodiment.

FIG. 3 illustrates a drone 302 with an onboard painting system 304, in accordance with at least one embodiment.

The drone 302 may be equipped with the onboard painting system 304 for rendering a visual image on a structure (not shown). The structure may include, but is not limited to, a wall, building, or house. The onboard painting system 304 may include one or more paint containers 306 for storing the paint of different colors and types. The one or more paint containers 306 may receive paints of different colors from a reservoir 308 via a hose 310. Further, the reservoir 308 may be placed on the ground. It should be noted that only one hose 310 is shown in FIG. 3. In one embodiment, more than one hose 310 connected to the reservoir 308 for different colors may be used as well, without departing from the scope of the disclosure.

The drone 302 includes one or more spray nozzles 312 connected to the onboard painting system 304. In one embodiment, the one or more spray nozzles 312 may be connected to the one or more paint containers 306. Further, the one or more spray nozzles 312 may be actuated electronically to spray a desired color of paint on the target. It should be noted that the one or more spray nozzles 312 may be chosen or configured to spray and apply paint on the target at a desired granularity based at least on the commands of the user. For example, the granularity may be a droplet diameter and a flow rate. In another embodiment, the drone 302 may automatically select the one or more spray nozzles 312 for applying the desired paint. In one embodiment, the one or more spray nozzles 312 may be chosen commensurate with the size of the target, a thickness of the paint, a distance of the UAV to the target structure when applying paint, and the pattern or image to be painted. It should be noted that only three spray nozzles 312 are depicted in FIG. 3. In one embodiment, more than three spray nozzles 312 may be used as well, without departing from the scope of the disclosure.

The drone 302 may include a plurality of blades 314 so that the drone 302 may fly. Further, the drone 302 may include backup spray nozzles 316 that are used when the spray nozzle 312 gets clogged. It should be noted that the drone 302 may automatically detect the clogging of the spray nozzle 312 and switch to the backup spray nozzles 316. Further, the drone 302 may be connected to a power source 318 for powering the drone 302 via an electrical connection 320. The power source 318 may include one or more batteries. Further, the drone 302 may be used for roller-based, spray-based, paintbrush, and other types of painting. In one embodiment, the drone 302 may include one or more power take-off engines (not shown) and electronic fuel injection system engines (not shown) for powering the drone 302 for flight, which may include power generators onboard for controlling the speed of motors within the craft. Further, the drone 302 may include a communication module for receiving control and navigation information. In one embodiment, the drone 302 may receive commands from the user. The commands may describe actions such as slowly painting with the sprayer, roller, or paintbrush.

In an alternate embodiment, the drone 302 may include a flight controller/processor, a navigation system, an altimeter, and a vision-tracking device. For example, a drone navigation subsystem may include a radio and amplifiers suitable for drone system communications in radio frequency bands such as ultrahigh frequency (UHF), very high frequency (VHF), and/or Wi-Fi, for real-time communication with the user computing device 106. In one embodiment, the drone 302 may include a memory storage device that receives and stores programmed flight path control information including instructions to navigate the drone 302 along a predetermined path, as well as control information and commands to configure the onboard painting system 304 for painting the structure.

It will be apparent to one skilled in the art that the drone 302 may be integrated with the one or more cameras 112, the one or more sensors 114, the one or more software modules 116, the lidar 118, the structured light emitters 120, and the LEDs 122, described above. It should be noted that the drone

302 may include some other modules and components as well, without departing from the scope of the disclosure.

Figure 4A:
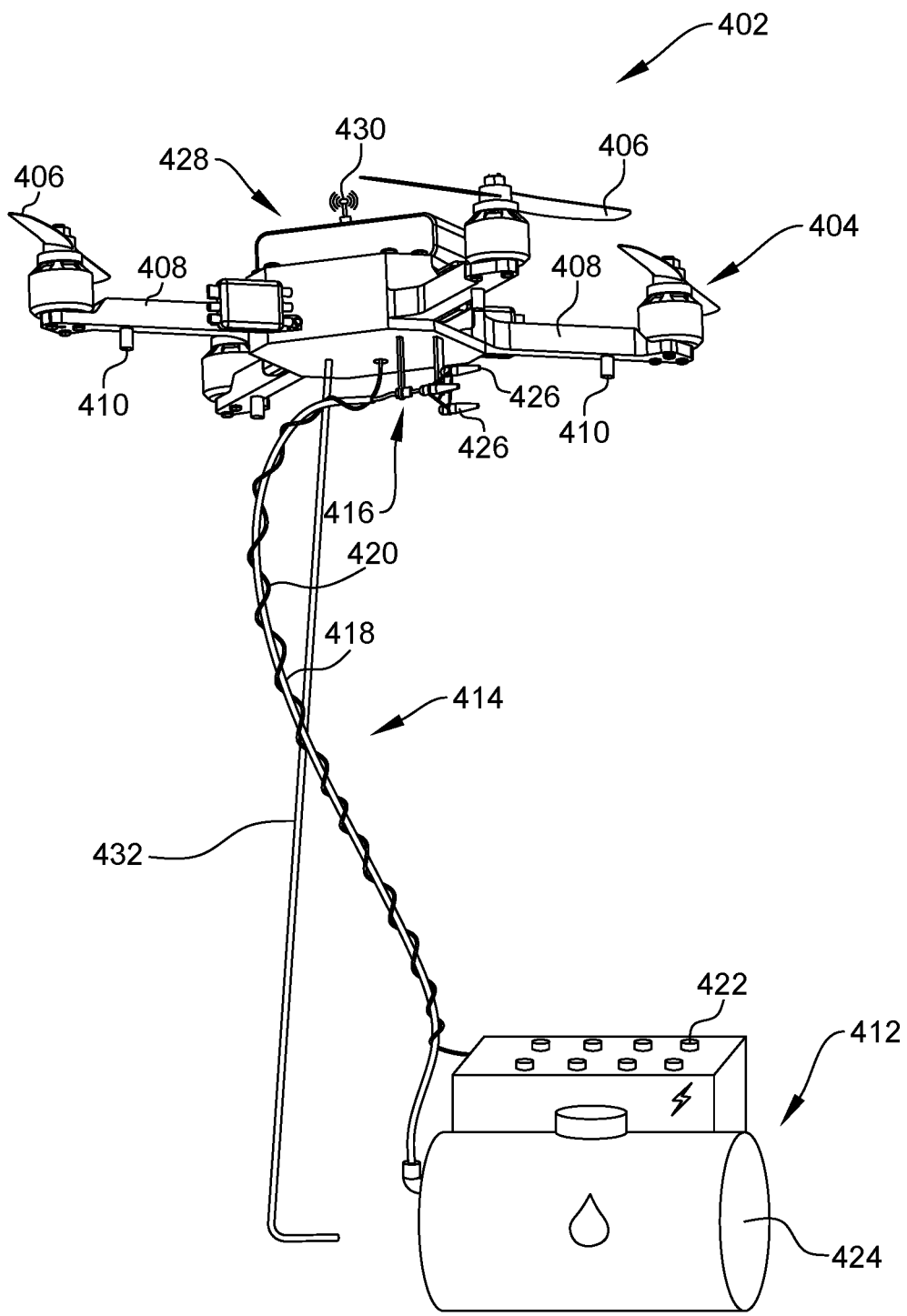
FIG. 4A illustrates a perspective view of an alternate embodiment of a drone 402, in accordance with at least one embodiment.

FIG. 4A illustrates a perspective view of an alternate embodiment of a drone 402, in accordance with at least one embodiment.

The drone 402 may include a plurality of rotor arms 404 having a plurality of rotors 406, each at an end portion of a boom 408. In one case, the drone 402 may incorporate propellers into the body of the drone 402. Further, the drone 402 may include a landing system 410. In one case, the landing system 410 may correspond to legs, skids, and/or skis. Further, the drone 402 may be connected to a ground station 412 using a tether 414. The tether 414 may be connected at a tether connection portion 416. The tether connection portion 416 may be a permanent or removable connection. Further, the tether connection portion 416 may be configured to provide data, power, and fluid connections to or from the drone 402. In one case, the tether 414 may include a liquid transportation channel 418 and an electrical connection 420. The electrical connection 420 may supply power to the drone 402 using a power source 422. In one embodiment, the drone 402 may have a built-in battery for supplying power to the drone 402.

Further, the drone 402 may receive paint from a reservoir 424 via the tether 414. It should be noted that the tether 414 may be of a length appropriate for performing a task or may be longer than needed and may contain another tether management device. In one embodiment, the tether 414 may be used to exchange data and information between the ground station 412 and the drone 402. In one embodiment, more than one tether 414 connected to the reservoir 424 for different colors may be used as well, without departing from the scope of the disclosure. In one embodiment, the reservoir 424 may contain one or more paint containers (not shown) for supplying different types of paint. The one or more paint containers may include solar paints. In one case, the one or more paint containers may be integrated with one or more batteries for supplying power. Further, the drone 402 may include one or more spray nozzles 426 for applying paint or another sprayable material. The one or more spray nozzles 426 may be connected to the one or more paint containers for receiving different types of paint. Further, the one or more spray nozzles 426 of different tips may be used. For example, the tips may correspond to a sprayer, a roller, or a paintbrush. Further, the one or more spray nozzles 426 may be configured to optimally apply paint when positioned normal to the surface being painted. In one case, the position may be determined based on various other parameters such as wind speed, spray material viscosity, or a thickness of the applied material. It should be noted that only three spray nozzles 426 are depicted in FIG. 4. In one embodiment, more than three spray nozzles 426 may be used as well, without departing from the scope of the disclosure.

In one embodiment, the one or more spray nozzles 426 are equipped with one or more sensors, such as pressure sensors, to aid in precisely identifying the location of walls. Further, the one or more spray nozzles 426 may be actuated using motors or actuators controllable by a command and control system 428 to adjust the orientation and/or position of the one or more spray nozzles 426. Such movement of the one or more spray nozzles 426 may be used to reach or point in directions that are inaccessible. Further, the drone 402 may include backup spray nozzles 426 that are used when one of the spray nozzles 426 gets clogged. It should be noted that the drone 302 may automatically detect the clogging of the spray nozzle 426 and switch to the backup spray nozzles.

Further, the command and control system 428 may receive inputs from sensors 430 to determine the positioning of the drone 402 relative to the surroundings. In one case, the sensors 430 may be omnidirectional sensors. Further, the command and control system 428 may control the plurality of rotors 406 to pilot the drone 402, to control altitude and attitude, pitch, yaw, and angular orientation of the drone 402. In one embodiment, the command and control system 428 may receive instructions from the user to fly to a designated area and perform a task. In one case, the task may correspond to painting a wall, cutting in portions of the wall, and/or painting an image on the wall. In one embodiment, the cameras and the one or more sensors may be used to detect "skips." Based on the detection, the command and control system 426 may cause the drone 402 to repaint such deficient areas. Such instructions may be received from the user via the user computing device 106. It should be noted that the drone 402 may operate autonomously after receiving the instructions.

Further, the drone 402 may be supported by a mechanical component, such as a supporting device 432 for stabilizing the drone 402. It should be noted that the drone 402 may be integrated with the camera 112, the one or more sensors 114, the one or more software modules 116, LIDAR 118, the structured light emitters 120, and LED 122, described above, without departing from the scope of the disclosure.

Figure 4B:
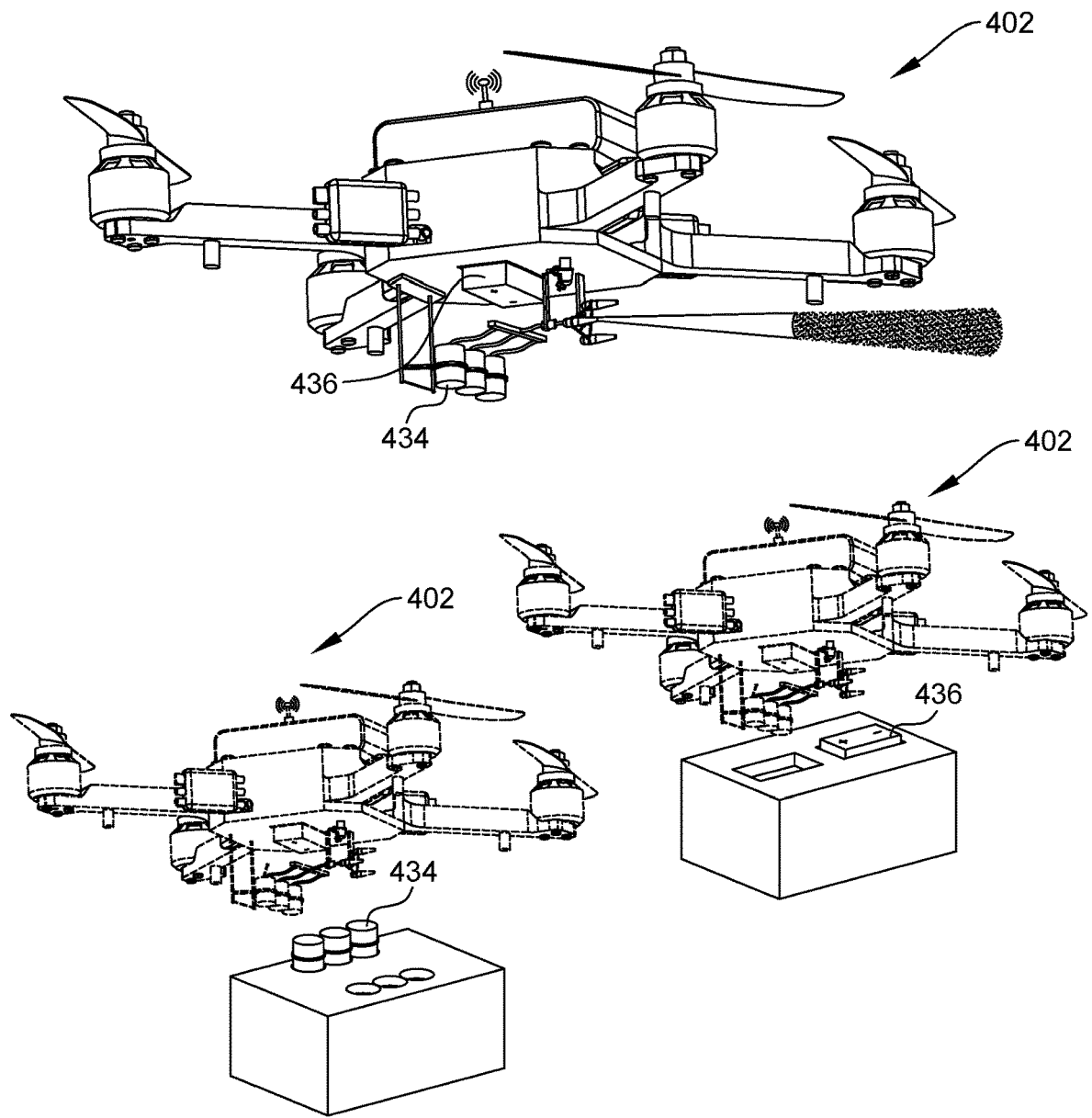
FIG. 4B illustrates a perspective view of the drone 402 integrated with a paint supply unit 434 and a power supply unit 436, in accordance with at least one embodiment.
Figure 4C:
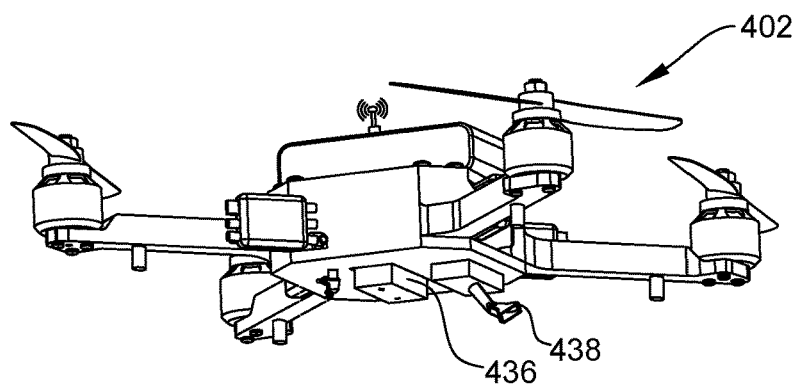
FIG. 4C illustrates a perspective view of the drone 402 used for cleaning purposes, in accordance with at least one embodiment.

In an alternate embodiment, the drone 402 may include an integrated paint supply unit 434 for supplying the paint or other sprayable material, as shown in FIG. 4B. It should be noted that the paint supply unit 434 may include one or more paint containers for supplying different types of paint. Further, the paint supply unit 434 may be detachable from the drone 402. For example, when the drone 402 is instructed to change the paint supply unit 434, the drone 402 may fly down to a base station (not shown) and change the paint supply unit 434 with another paint supply unit. In one embodiment, the paint supply unit 434 may rotate in all directions to paint the target while the drone 402 is standing still. In one embodiment, the drone 402 may be integrated with a power supply unit 436 for supplying power to the drone 402. Further, the power supply unit 436 may be detachable from the drone 402. For example, when the drone 402 is instructed to change the power supply unit, the drone 402 may fly down to the base station (not shown) to change the power supply unit 434 with another power supply unit. In one case, the power supply unit 436 may be a rechargeable battery. In one embodiment, the drone 402 may be configured for cleaning purposes, as shown in FIG. 4C. The drone 402 may include a cleaning device 438 for cleaning the target. The cleaning device 438 may include one or more water containers (not shown). Further, the cleaning device 438 may use Dilute Sulfuric Peroxide (DSP) to clean the house. Such features of the drone 402 may be beneficial for performing different tasks, such as cleaning and painting.

Figure 5A:
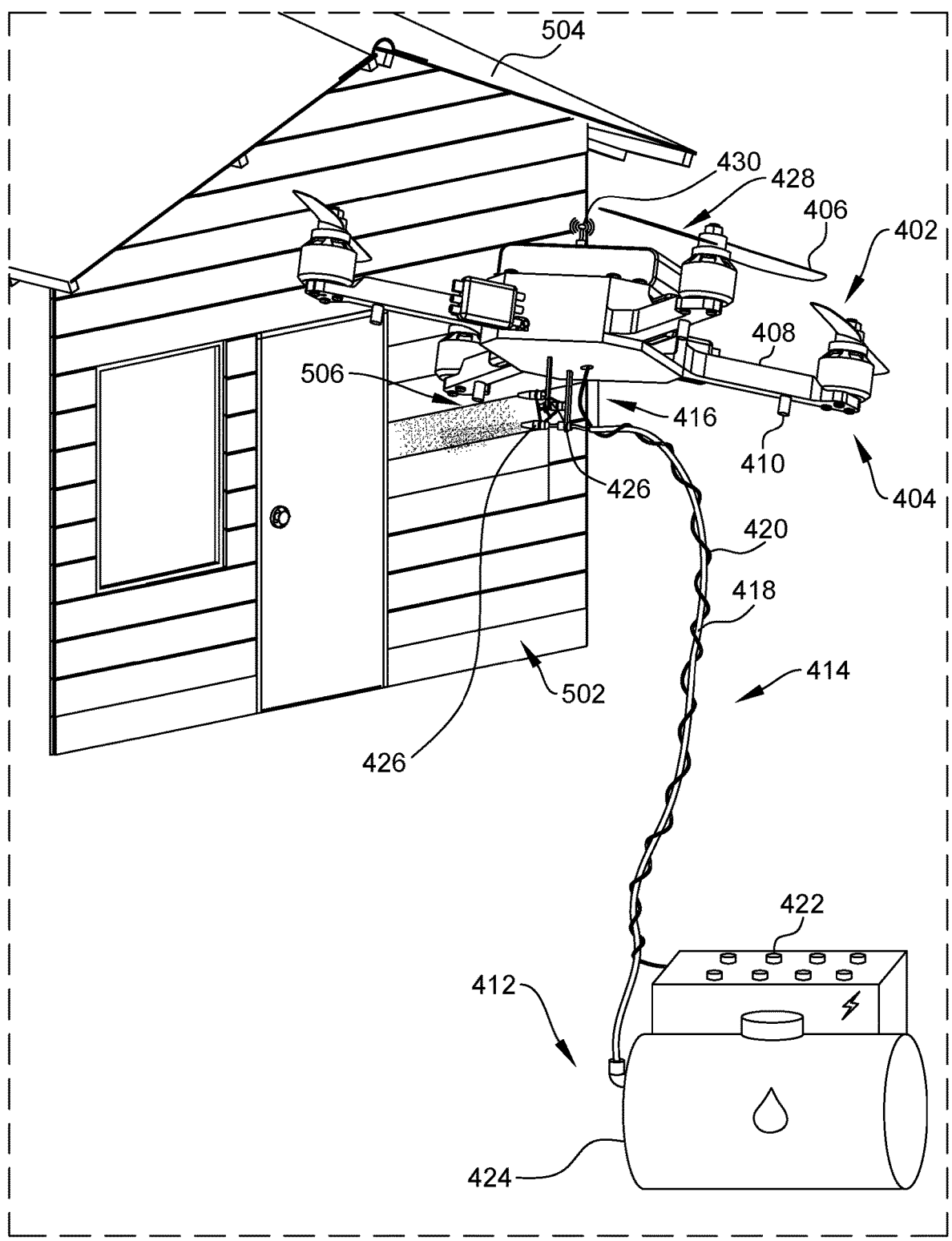
FIG. 5A illustrates the drone 402 tethered with a reservoir 424, for painting a wall 502 of a house 504, in accordance with at least one embodiment.

As shown in FIG. 5A, the drone 402, tethered with the reservoir 424, may be used to paint (shown as 506) a wall 502 of the house 504. The drone 402 may receive the paint supply from the reservoir 424. As discussed above, the reservoir 424 may contain one or more paint containers (not shown) for supplying different types of paint. At first, the drone 402 may capture images of the wall 502. The images may be panoramic images. It should be noted that the images may be captured using one or more cameras. In one case, the drone 402 may automatically scan the wall 502. The scanning of the wall 502 may correspond to a three-dimensional (3D) scan. In one embodiment, the drone 402 may detect the edges of the wall 502. Successively, the drone 402 may create a high-resolution picture using the images. Further, the drone 402 may use a bump map (i.e., surface distance map), such as one acquired using lidar, to correct the image, and use localized light to consistently preserve the color. Successively, the drone 402 may perform cleaning of the wall 502. In one case, the drone 402 may act as a cleaning drone.

Further, the drone 402 may take pictures after the cleaning to ensure that the cleaning does not affect the image. Successively, the drone 402 may detect a difference between dirt and the picture itself through a particle detection technique or an obstacle detection technique. Thereafter, the drone 402 may use the one or more spray nozzles 426 for applying paint or another sprayable material on the wall 502. Further, the one or more spray nozzles 426 may be configured to optimally apply paint when positioned normal to the surface being painted. In one case, the position may be determined automatically by the drone 402 based on various other parameters, such as wind speed, spray material viscosity, or a thickness of the applied material. In another case, the position may be determined automatically by the sensors 430 to position the drone 402 in one or more positions and orientations to carry out the desired task.

It should be noted that the drone 402 may be integrated with artificial intelligence (AI) technology and/or edge-finding algorithms. Further, the drone 402 may have a database that is configured to store details related to good and bad edge-painting techniques. In one embodiment, the drone 402 may use one or more tools, such as a sprayer, a paintbrush, and/or a roller, to perform different types of painting. It will be apparent to one skilled in the art that the above-mentioned drone 402 for painting the wall 502 has been described only for illustration purposes. In the case of murals, the drone 402 may automatically scan the wall 502. Based at least on the scanning, the drone 402 may replicate murals by accurately scanning a mural and painting a scaled replica of the mural in one or more other locations. In one embodiment, the drone 402 may design advertisements in mural form, without departing from the scope of the disclosure.

Figure 5B:
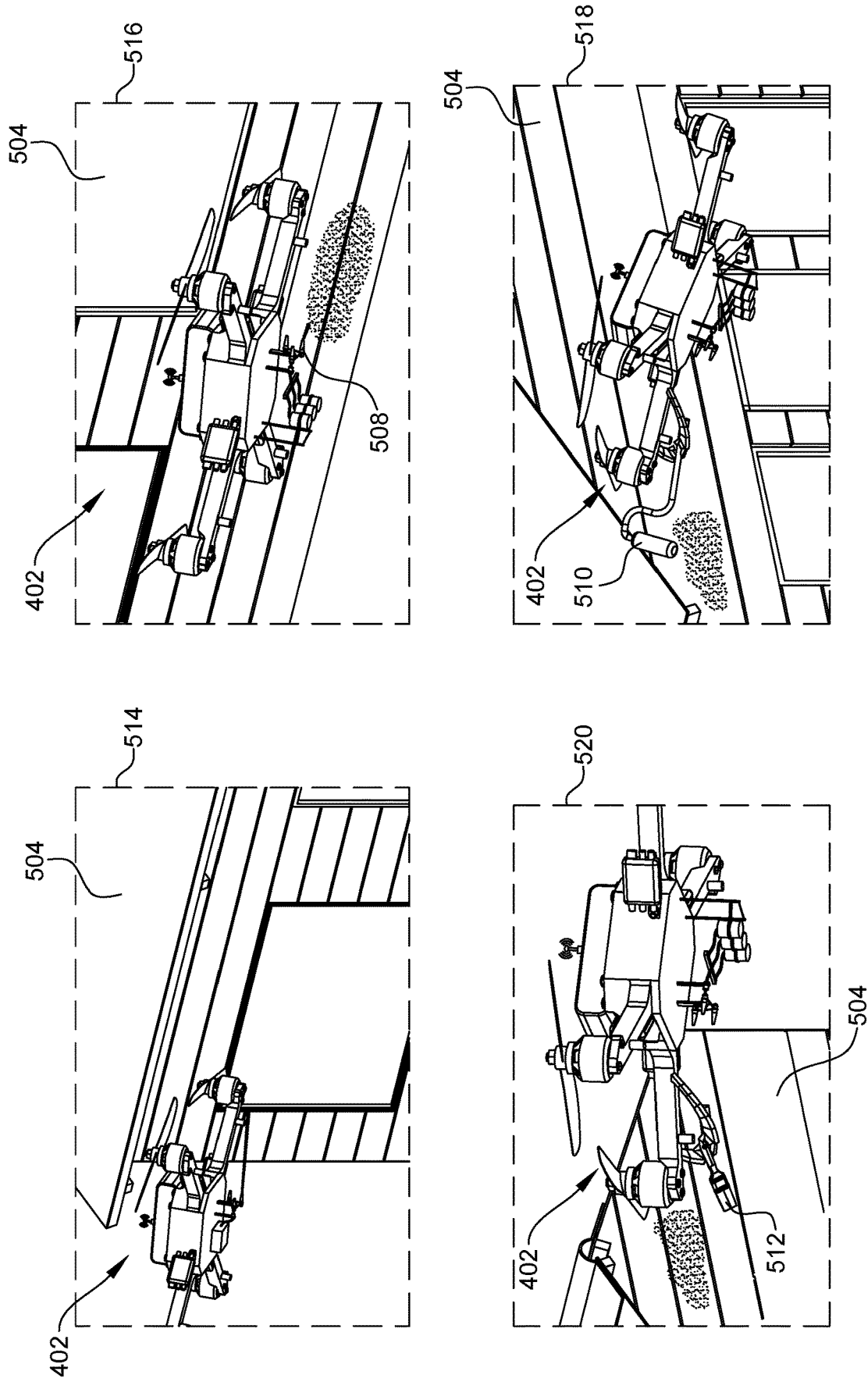
FIG. 5B illustrates a single drone 402 that is capable of performing different tasks, in accordance with at least one embodiment.

As shown in FIG. 5B, the single drone 402 may perform tasks including, but not limited to, cleaning the house 504, taping the house 504, painting the house 504 with a sprayer 508, painting the house 504 with a roller 510, and/or painting the house 504 with a paintbrush 512. For example, in a first scenario (shown as 514), the drone 402 may perform taping of the house 504. The taping may protect sections of the house 504 from paint overspray. In a second scenario (shown as 516), the drone 402 may paint the house with the sprayer 508. In a third scenario (shown as 518), the drone 402 may paint the house 504 with the roller 510. In a fourth scenario (shown as 520), the drone 402 may paint the house with the paintbrush 512. In one embodiment, the drone 402 may deploy ultraviolet (UV) protection coating to protect the underlying material from the harmful effects of radiation. It should be noted that all these tasks may be performed one after another by the single drone 402. Such modular drones may be efficient, reliable, and cost-effective.

Figure 5C:
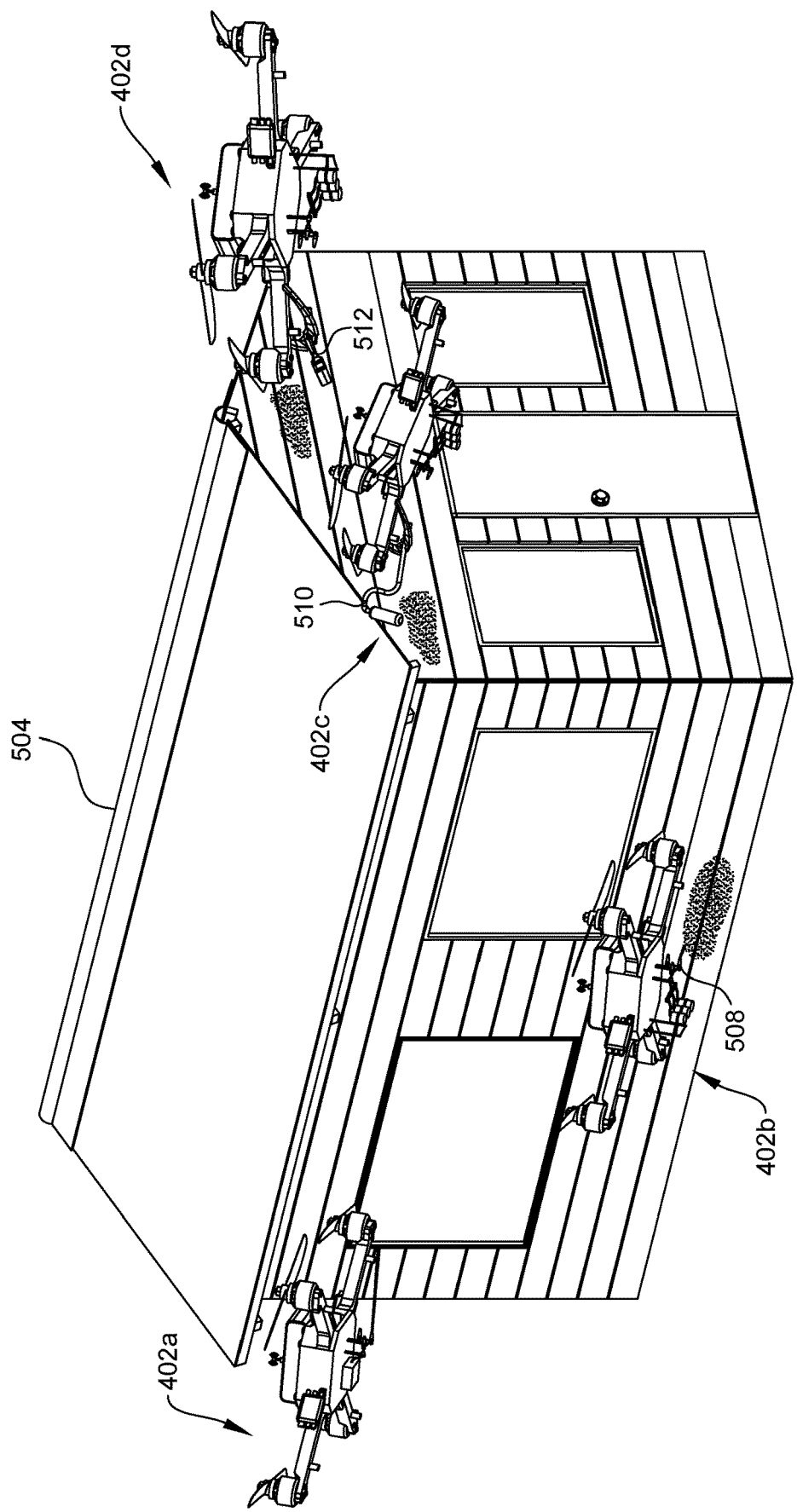
FIG. 5C illustrates multiple drones 402a, 402b, 402c, and 402d performing different tasks, in accordance with at least one embodiment.

As shown in FIG. 5C, multiple drones 402a, 402b, 402c, and 402d may perform different tasks. The multiple drones 402a, 402b, 402c, and 402d may work in tandem. For example, the drone 402a may perform taping of the house 504. In one case, the taping may be performed using liquid mask. The liquid mask may correspond to spray that is applied to those surfaces not requiring painting. Similarly, the drone 402b may paint the house 504 with the sprayer 508. On the other hand, the drone 402c may paint the house 504 with the roller 510. Similarly, the drone 402d may paint the house 504 with the paintbrush 512. Such scenarios wherein the multiple drones 402a, 402b, 402c, and 402d performing different tasks simultaneously may make the process more time-efficient. It should be noted that while four drones are depicted in FIG. 5C, any number of drones may be used in tandem without departing from the scope of the disclosure.

Figure 6A:
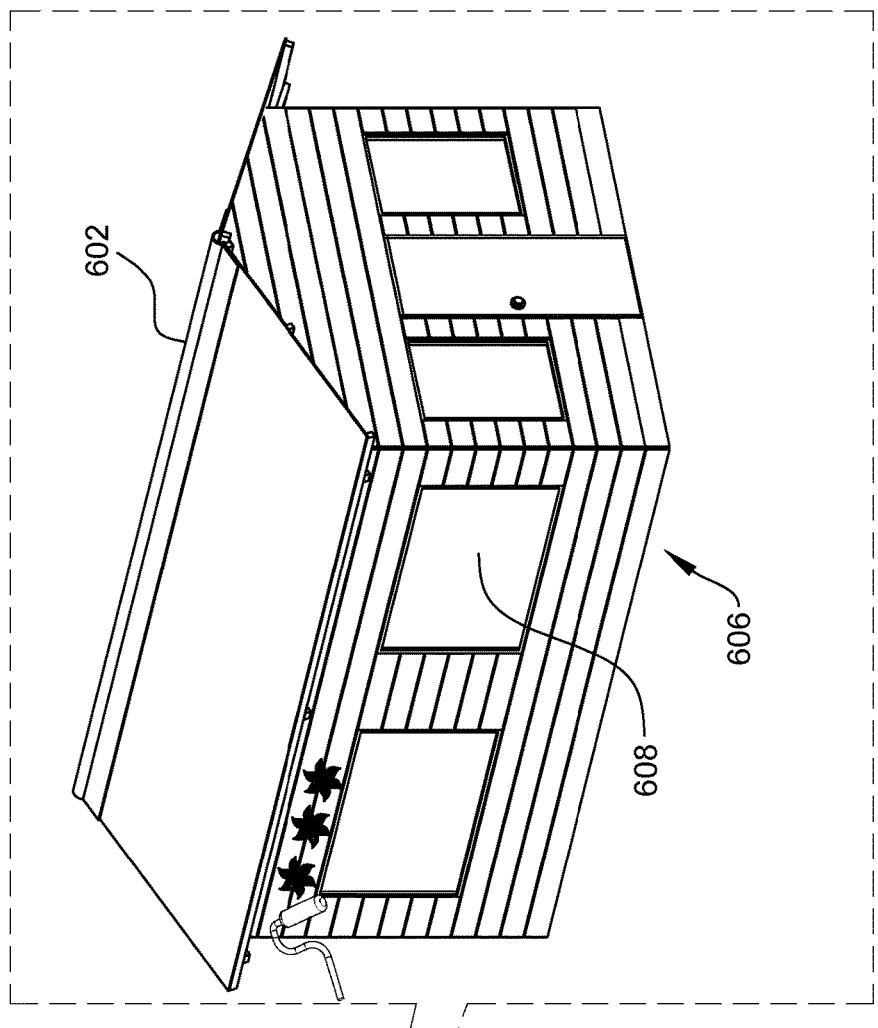
FIG. 6A illustrates remote-control painting of a house 602 by a painter 604 steering the drone 302, in accordance with at least one embodiment.
Figure 6A:
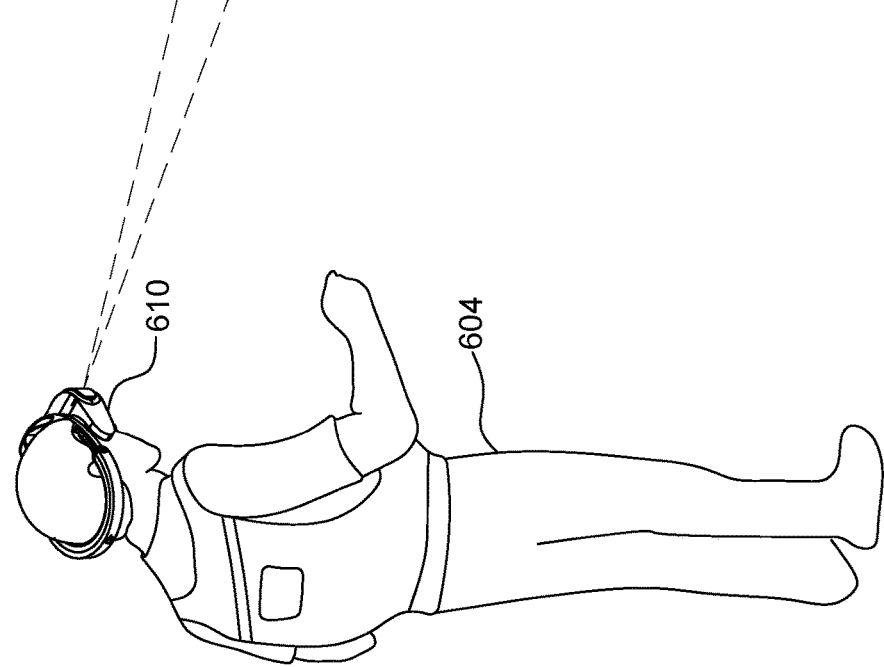
Figure 6B:
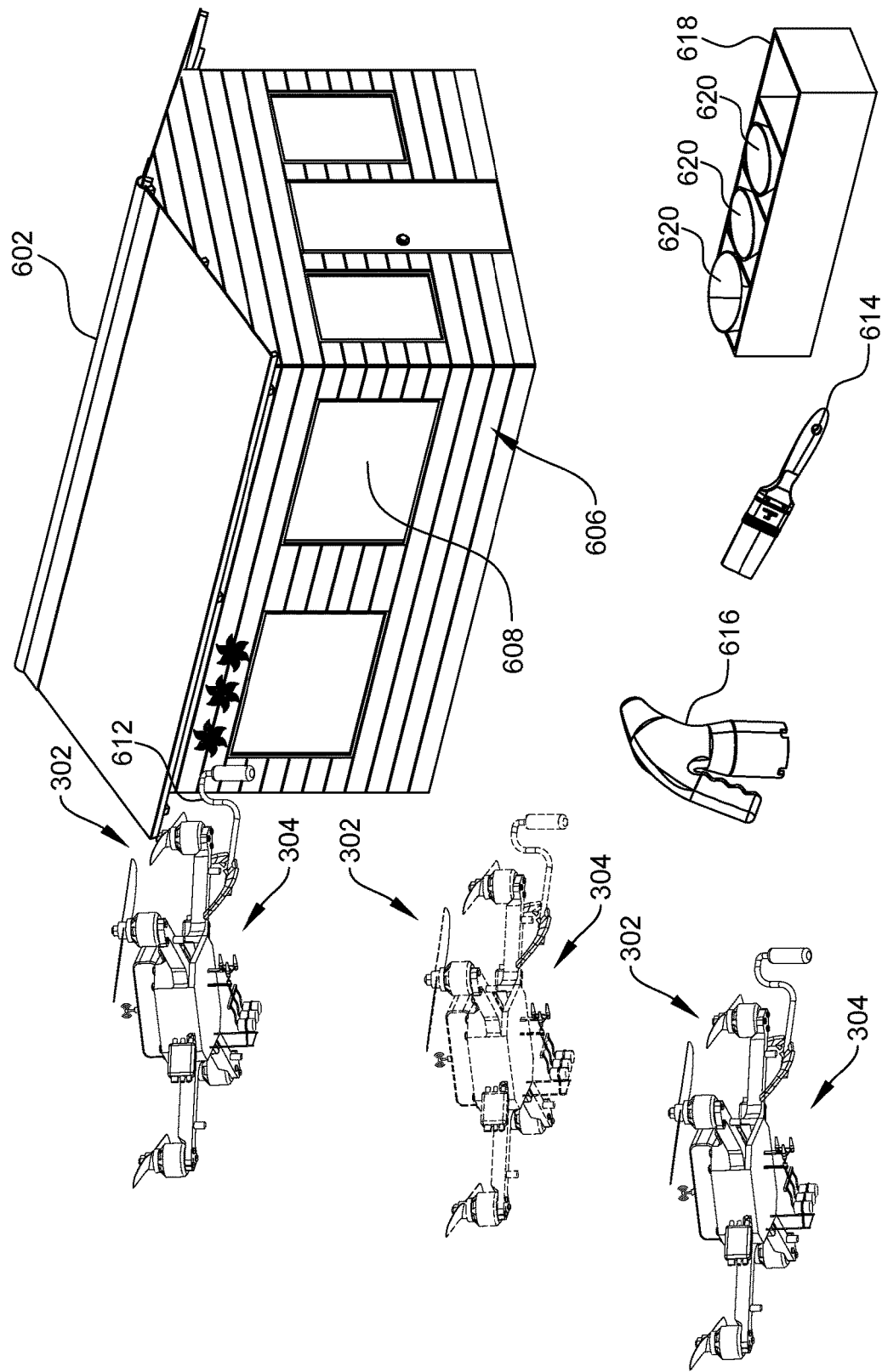
FIG. 6B illustrates remote-control painting of a house 602 by a painter 604 steering the drone 302, in accordance with at least one embodiment.
Figure 6C:
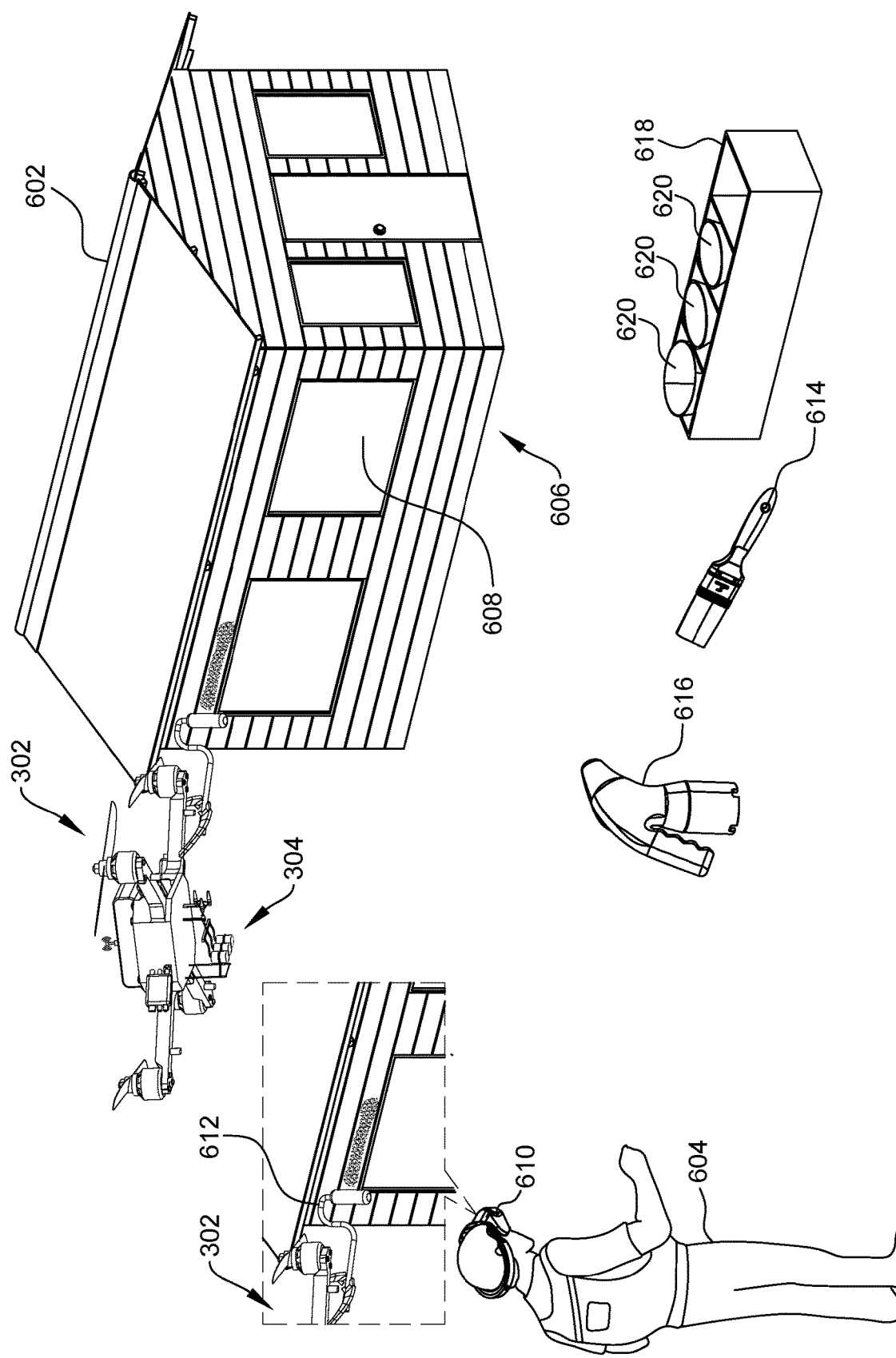
FIG. 6C illustrates remote-control painting of a house 602 by a painter 604 steering the drone 302, in accordance with at least one embodiment.

FIGS. 6A, 6B, and 6C illustrate remote-control painting of a house 602 by a painter 604 steering the drone 302, in accordance with at least one embodiment. Hereinafter, the drone 302 explained in FIG. 3 may be used as a reference for explanation purposes.

As shown in FIG. 6A, the painter 604 may prepare a plan for painting the house 602. For purposes of illustration, the plan may include, but is not limited to, painting a wall 606 of the house 602 using a roller or a sprayer, painting the edges of the wall 606 using a paintbrush, and cleaning the windows 608 of the house 602. It should be noted that the pre-planning may be performed based at least on scanning of the house 602 performed by the drone 302. In one embodiment, the painter 604 may wear wearable glasses 610 to do the planning of painting the house 602. The wearable glasses 610 may allow the painter 604 to see how the house 602 will look after painting. The detailed description of the wearable glasses 610 is provided below in conjunction with FIG. 7.

Successively, the painter 604 may embed the plan for painting the house 602 in the drone 302. It should be noted that the drone 302 may be preprogrammed with a flight path to paint the house 602 in a similar manner as prepared by the painter 604. As shown in FIG. 6B, the drone 302 may start painting the wall 606 by moving from one direction to another i.e., from left to right. Further, the drone 302 may pick up a roller 612 for painting the wall 606 of the house 602. Further, the drone 302 may contain algorithms which determine, on-the-fly, the appropriate actions to take in order to paint the wall 606 of the house 602. Further, the drone 302 may figure out which tool to use near edges. In an example, the drone 302 may use a paintbrush 614 on the edges and/or a sprayer 616 on the entire surface of the wall 606. Further, the drone 302 may receive the paint supply from a reservoir 618. The reservoir 618 may contain one or more paint containers 620 of different colors. The drone 302 may automatically fill the onboard painting system 304 from the reservoir 618 and perform the painting of the house 602. In one embodiment, the drone 302 may receive the paint supply from the reservoir 618 via a tether (not shown). It should be noted that video cameras and/or other sensors attached to the drone 302 may monitor the paint application and adjust the paint flow or paint pressure. In one embodiment, the drone 302 may complete an additional pass over the area with another spray for optimal paint application and coverage.

As shown in FIG. 6C, the painter 604 may wear the wearable glasses 610. Using the wearable glasses 610, the painter 604 may monitor the functioning of the drone 302 in real time. The painter 604 may zoom in on live video or images to see an area where the drone 302 is painting. Further, the painter 604 may give one or more commands to the drone 302. The one or more commands may include, but are not limited to, using the paintbrush 614 on the edges and/or the sprayer 616 on the entire surface of the wall 606. Such use of the wearable glasses 610 for guiding and controlling the drone 302 may be efficient and effective.

Figure 7:
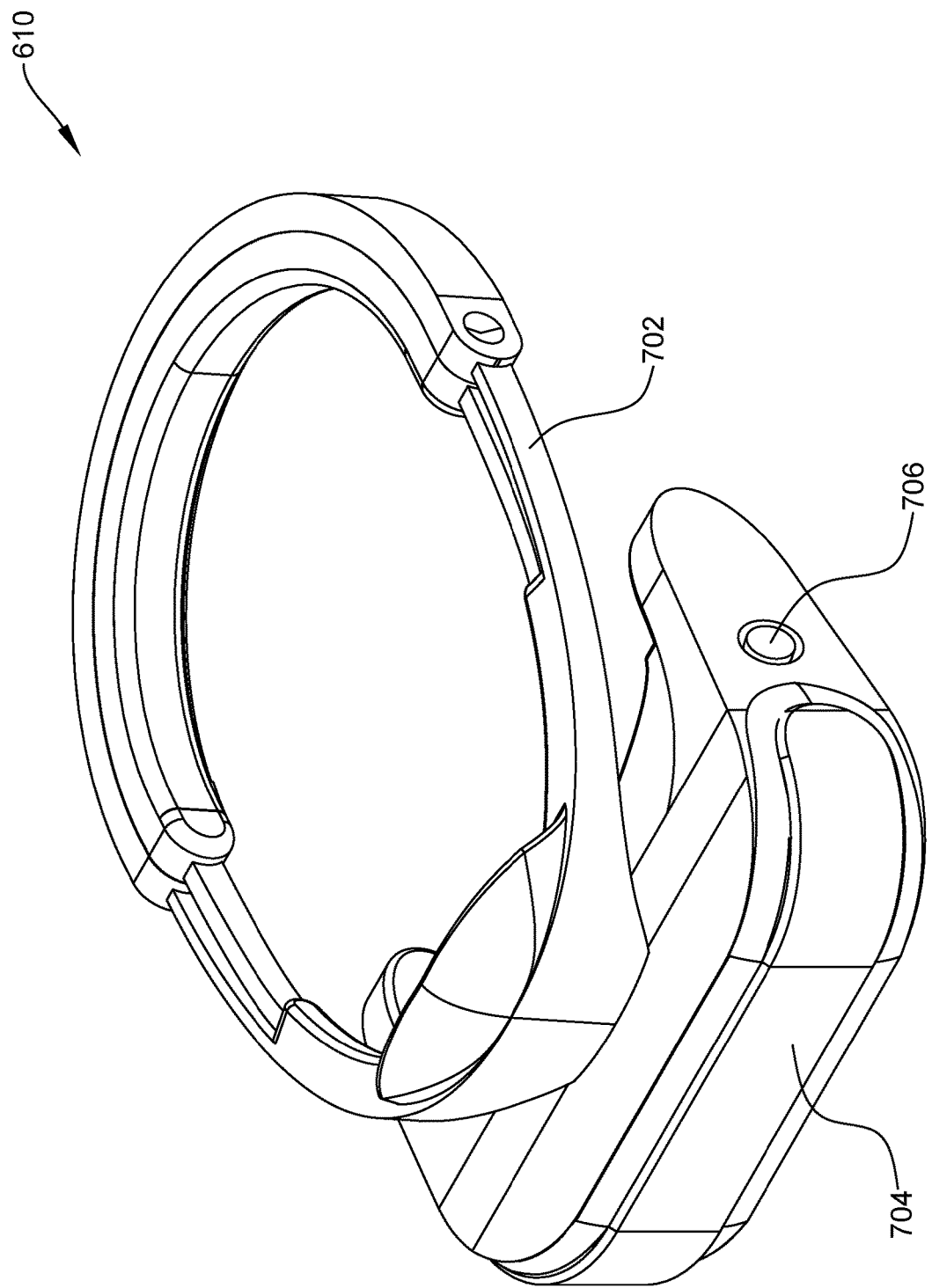
FIG. 7 illustrates wearable glasses 610, in accordance with at least one embodiment.

FIG. 7 illustrates the wearable glasses 610, in accordance with at least one embodiment. The wearable glasses 610 may be worn by the painter 604 (shown in FIG. 6) in preparing a plan to paint the house. The wearable glasses 610 may be integrated with AR technology, light field technology, and/or VR positioning technology. It should be noted that the wearable glasses 610 may include some other technologies as well, without departing from the scope of the disclosure. The wearable glasses 610 may include a frame 702 and one or more lenses 704. The one or more lenses 704 may be detachably mounted in the frame 702. The frame 702 may be made up of a material such as a plastic or metal. The wearable glasses 610 may allow the painter 604 to define one or more actions for painting the house. Further, the wearable glasses 610 may include one or more cameras 706 for capturing images. Further, the wearable glasses 610 may have an integrated battery and a central processing unit (CPU), in accordance with at least one embodiment. The battery may be disposed within the frame 702 of the wearable glasses 610. It should be noted that the battery may be disposed at various positions on the frame 702. For example, the battery may be disposed at an end of the frame 702 of the wearable glasses 610. In one case, the battery may be a rechargeable battery.

It will be apparent to one skilled in the art that the above-mentioned components of the wearable glasses 610 have been provided only for illustration purposes. In one embodiment, the wearable glasses 610 may include a separate display device, a sound output unit, a plurality of cameras, an elastic band, or any number of other accoutrements without departing from the scope of the disclosure.

Figure 8:
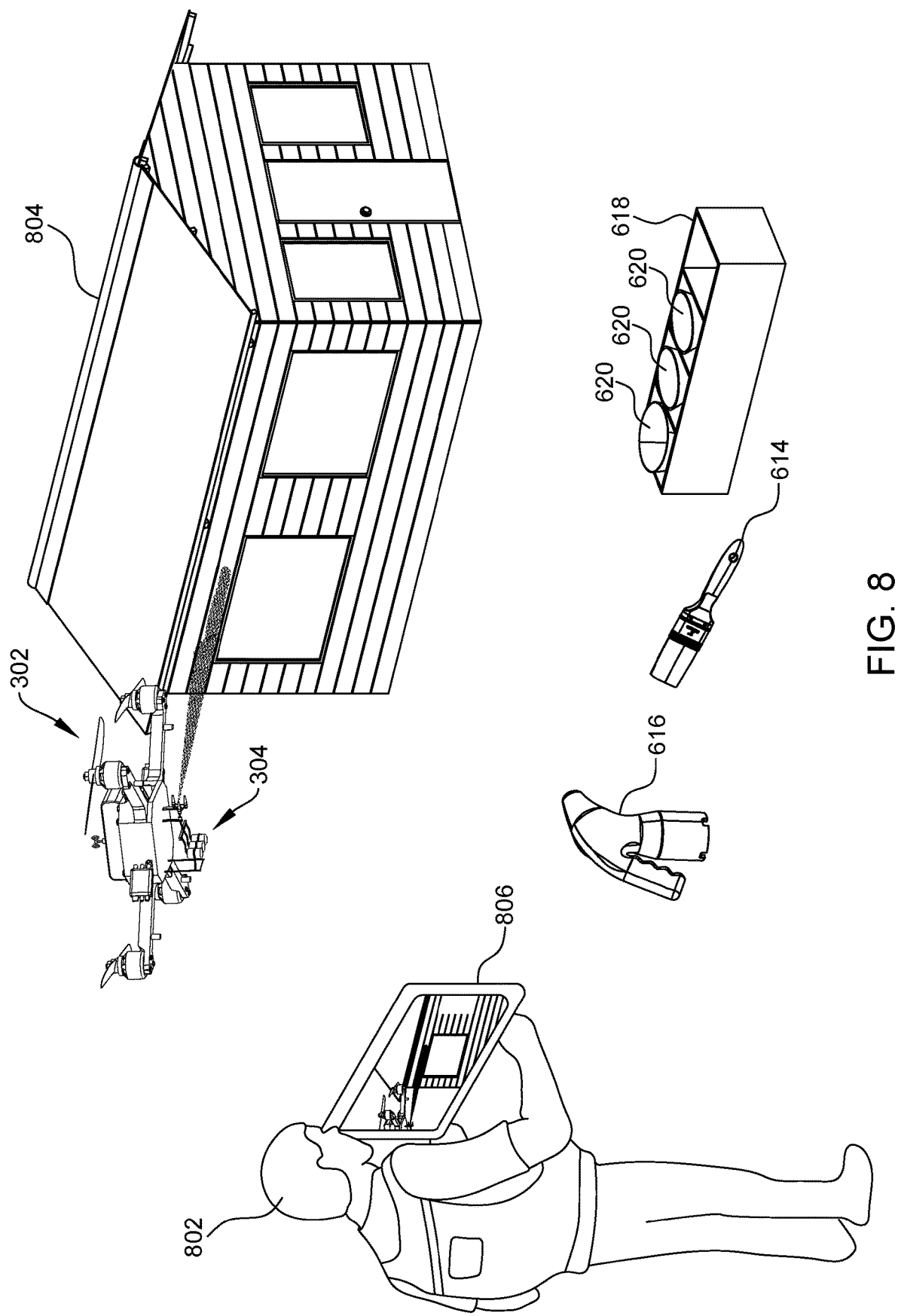
FIG. 8 illustrates a user 802 controlling the drone 302 in real time, in accordance with at least one embodiment.

FIG. 8 illustrates a user 802 controlling the drone 302 in real time, in accordance with at least one embodiment.

At first, the drone 302 may perform 3D scanning of a house 804. Successively, the drone 302 may capture images of the house 804. Thereafter, the drone 302 may perform painting of the house 804 based at least on one or more commands received from the user 802. The user 802 may pilot the drone 302 to the designated area and cause the drone 302 to perform the task by sending a series of commands (i.e., remote control operation). It should be noted that the user 802 may use a tablet 806 to guide the drone 302. The user 802 may zoom in on live video or images captured by the drone 302 on the tablet 806. In one case, the user 802 may easily select portions of the house 804 to paint by first taking an image or a series of images of the house 804 via onboard cameras within the tablet 806. In one embodiment, the user 802, using the tablet 806, may analyze the image in real time. Based at least on the analysis, the user 802 may select an area for painting or performing some other task.

In one embodiment, the house 804 may be scanned and a report may be prepared. For example, the report may specify that windows need cleaning whereas other windows do not. In another example, a specific section of the house 804 may need painting whereas another section may only need spot treatments and another section may not need any coating or paint. In one embodiment, the user 802 may view a bump map of a surface on the tablet 806. The bump map may correspond to a surface the drone 302 is painting. Thereafter, the user 802 may give the one or more commands to the drone 302. In one example, a command may be to paint a desired portion of a wall by flying in a raster pattern and spraying paint on the wall while flying. The one or more commands may include, but are not limited to, using a paintbrush at edges, using a sprayer for painting the walls of the house, and/or using a roller for a particular design on the walls of the house. Based on the one or more commands of the user 702, the drone 302 may perform the painting of the house 804.

The drone 302 may receive the paint supply from a reservoir 618. The reservoir 618 may include the one or more paint containers 620 for supplying paint to the drone 302. The drone 302 may automatically fill the onboard painting system 304 from the reservoir 618 and perform the painting of the house 804. It should be noted that the drone 302 may paint the house 804 after receiving the commands from the user 802 in real time. It will be apparent to one skilled in the art that the drone 302 may receive the paint supply from the reservoir 618 via a tether (not shown), without departing from the scope of the disclosure.

In one embodiment, the user 802 may paint the house 804 using paint that is only visible to the user 802 while wearing the infrared (IR) glasses. It should be noted that such paint is not visible to the user 802 without the IR glasses. After painting by the user 802, the drone 302 may start painting the house in a similar manner by detecting the location of the IR-visible paint. Such scenarios may allow the user 802 to get the house 802 painted in the desired manner using the invisible paint. In one embodiment, the user 802 may use a laser scanner (not shown) and a projector system (not shown) to assist in painting the house 804. It should be noted that a standing laser may be used, without departing from the scope of the disclosure.

Figure 9A:
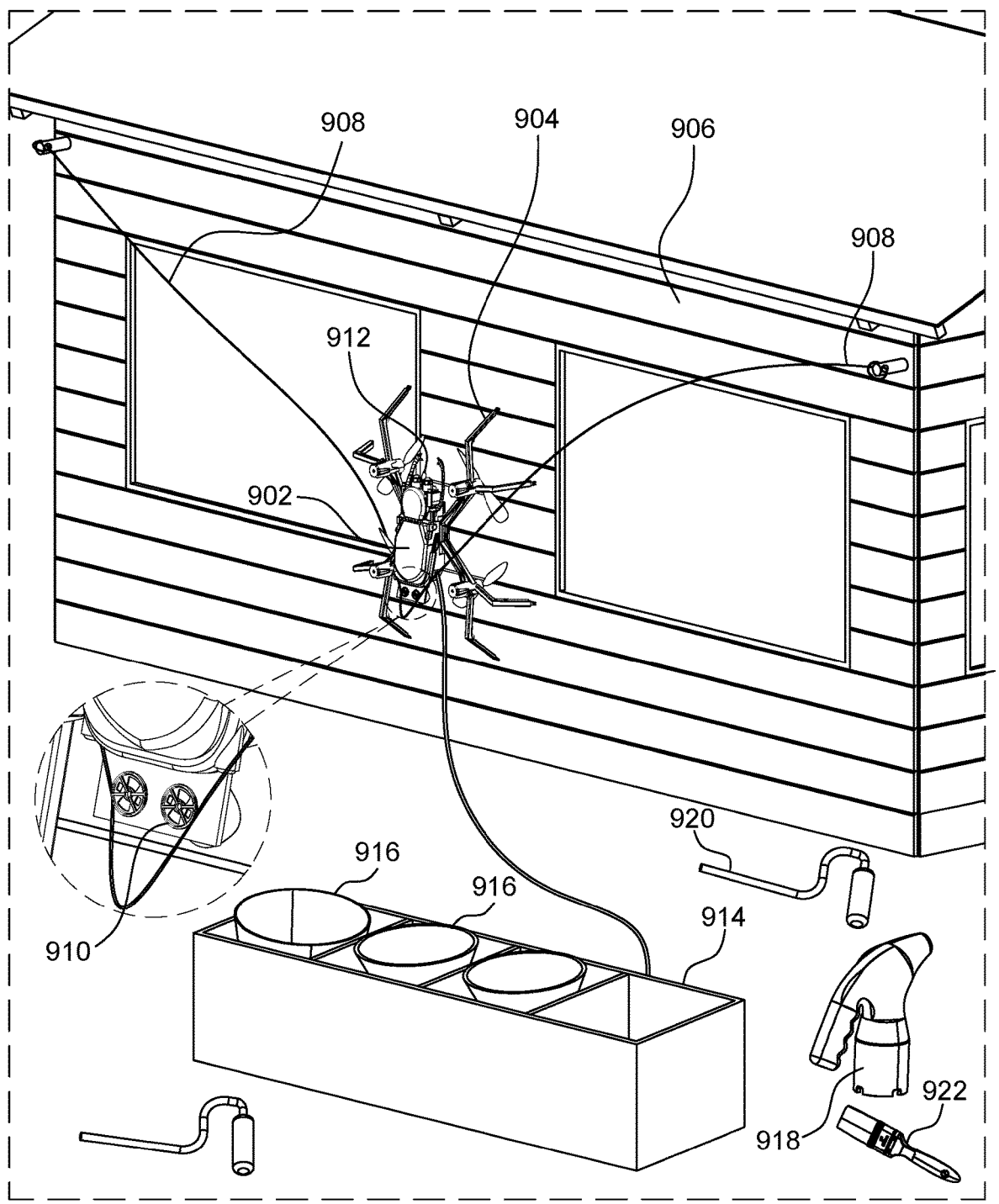
FIG. 9A illustrates a drone 902 with feet 904, painting a house 906, in accordance with at least one embodiment.
Figure 9B:
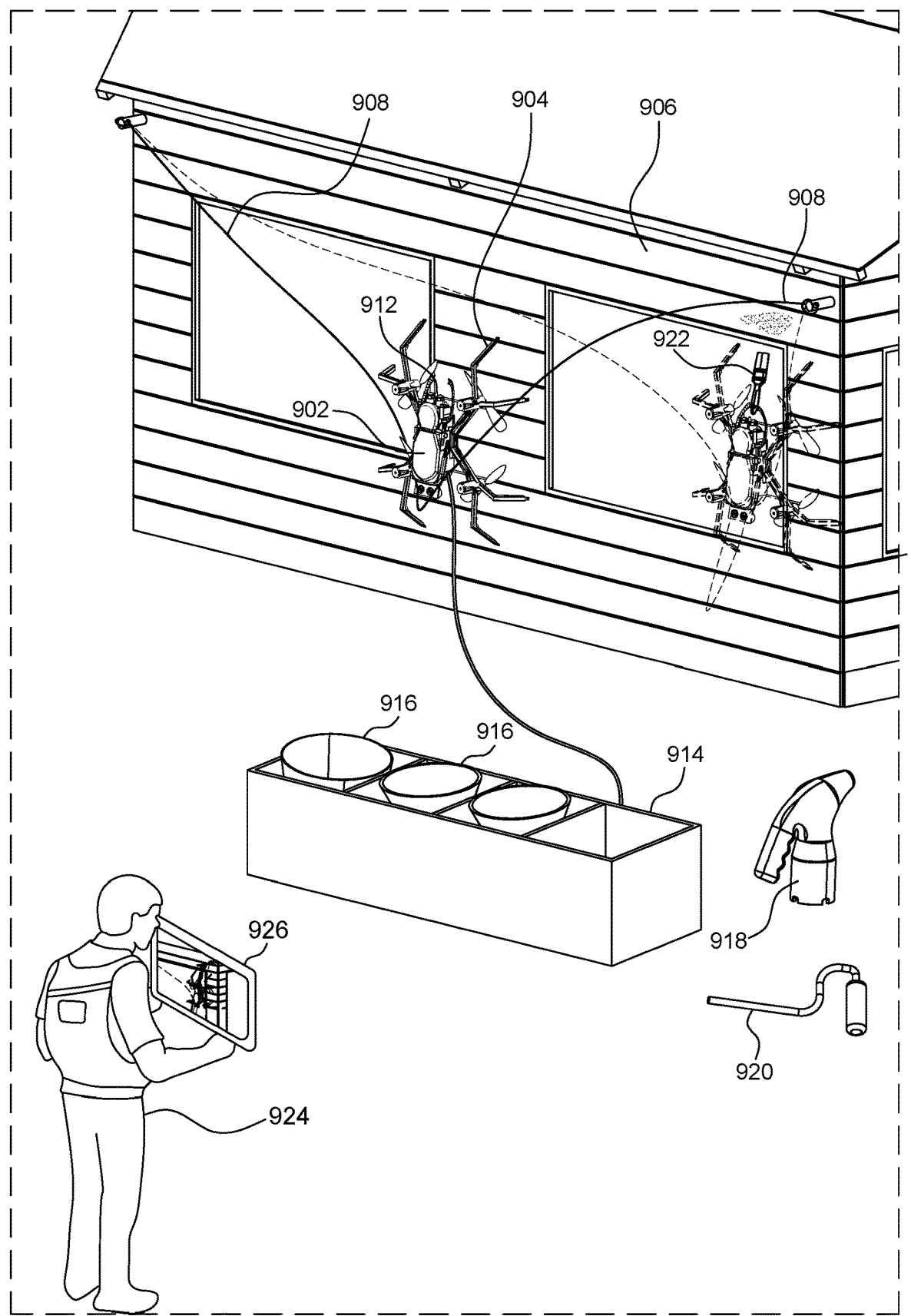
FIG. 9B illustrates a drone 902 with feet 904, painting a house 906, in accordance with at least one embodiment.

FIGS. 9A and 9B illustrate a drone 902 with feet 904, painting a house 906, in accordance with at least one embodiment.

As shown in FIG. 9A, the drone 902 may be hung with wires 908 to paint the house 906. The wires 908 may be rotated through a plurality of rollers 910. It should be noted that the plurality of rollers 910 may be a part of the drone 902. Further, the drone 902 may include a spray nozzle 912 for spraying the paint. It should be noted that the drone 902 may receive the paint supply from a reservoir 914. The reservoir 914 may include one or more containers 916 of the paint. Such a drone 902 may be used to perform various types of painting such as spray painting using a sprayer 918, roller-based painting using a roller 920, and/or fine-grained painting using a paintbrush 922.

As shown in FIG. 9B, a user 924 may use a tablet 926 in real time to check the painting done by the drone 902. In one case, the user 924 may zoom in to see a particular section of the house 906. Based at least on the scanning, the user 924 may give an instruction to the drone 902. The instruction may include, but is not limited to, using the paintbrush 922 to do the painting at a particular section of the house 906. In one example, the user 924 may give a command such as to use the roller 920 while painting the wall of the house 906. Such monitoring may allow the user 924 to identify errors in the painting in real time and correct them by giving instructions to the drone 902.

Figure 9C:
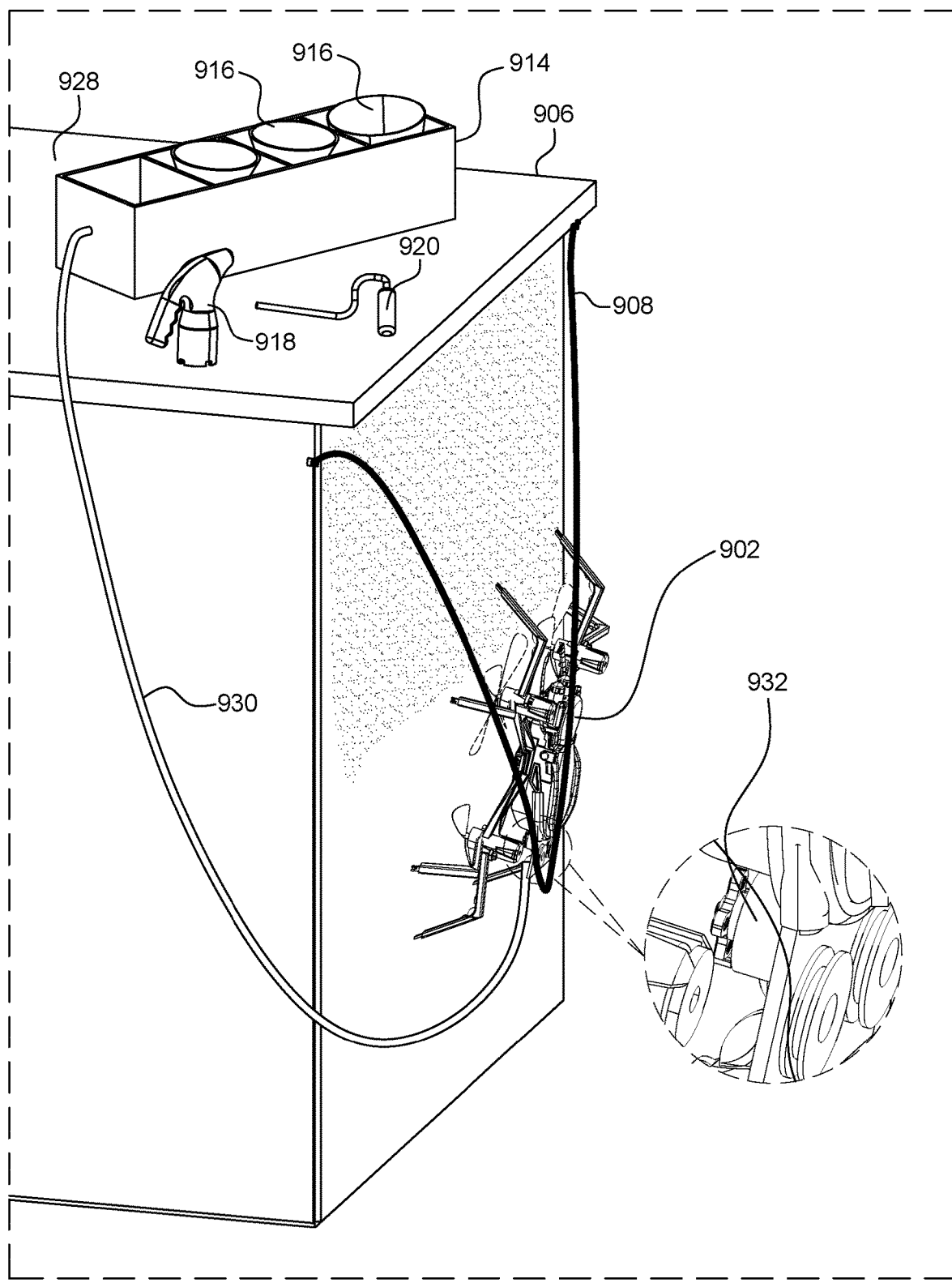
FIG. 9C illustrates an alternate embodiment of the drone 902 integrated with a motor 932, in accordance with at least one embodiment.
Figure 9D:
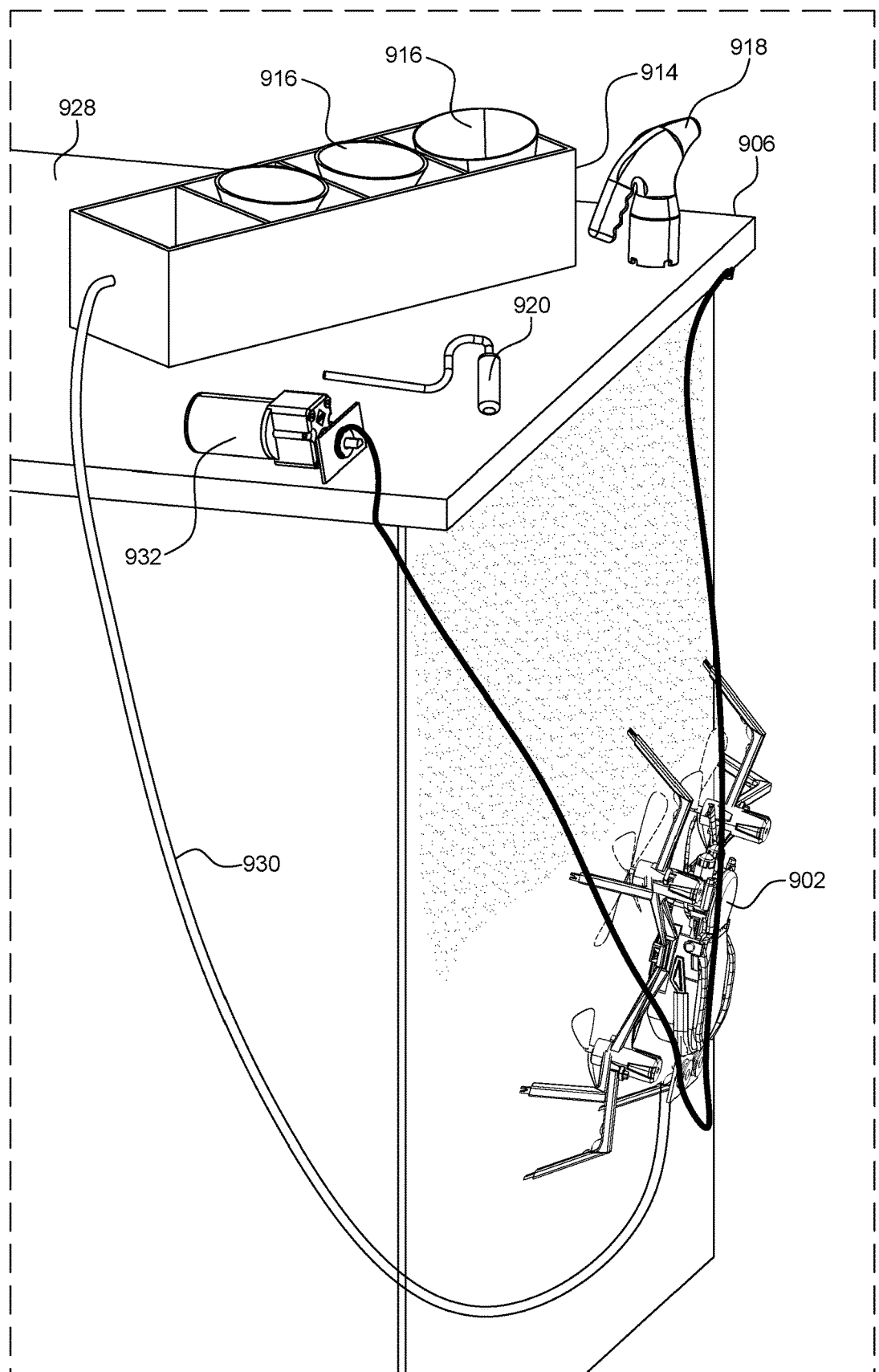
FIG. 9D illustrates an alternate embodiment of the drone 902 where the motor 932 is placed on a roof 928, in accordance with at least one embodiment.

In an alternate embodiment, the reservoir 914 may be placed on a roof 928 of the house 906, as shown in FIG. 9C. Further, the drone 902 may receive the paint supply from the reservoir 914. As discussed above, the reservoir 914 may include the one or more containers 916 of the paint. It should be noted that the drone 902 may receive the paint supply via a tether 930. Further, the drone 902 may be integrated with a motor 932 that allows movement of the drone 902. It should be noted that the movement may be adjusted using the wires 908. Such movement may help the drone 902 in painting the house 906. Further, the drone 902 may paint the house 906 by moving from one direction to another—e.g., from left to right. While painting the house 906, the drone 902 may utilize the feet 904 for holding a position on a wall strongly in order to apply the paint. In one embodiment, other components, such as the sprayer 918 and the roller 920, may be placed on the roof 928. In another embodiment, the motor 932 may be placed on the roof 928 along with the reservoir 914, shown in FIG. 9D. The motor 932 (i.e., a stationary motor) may control the drone 902 while painting the house 906. Such a scenario may be helpful in painting large buildings.

Figure 10A:
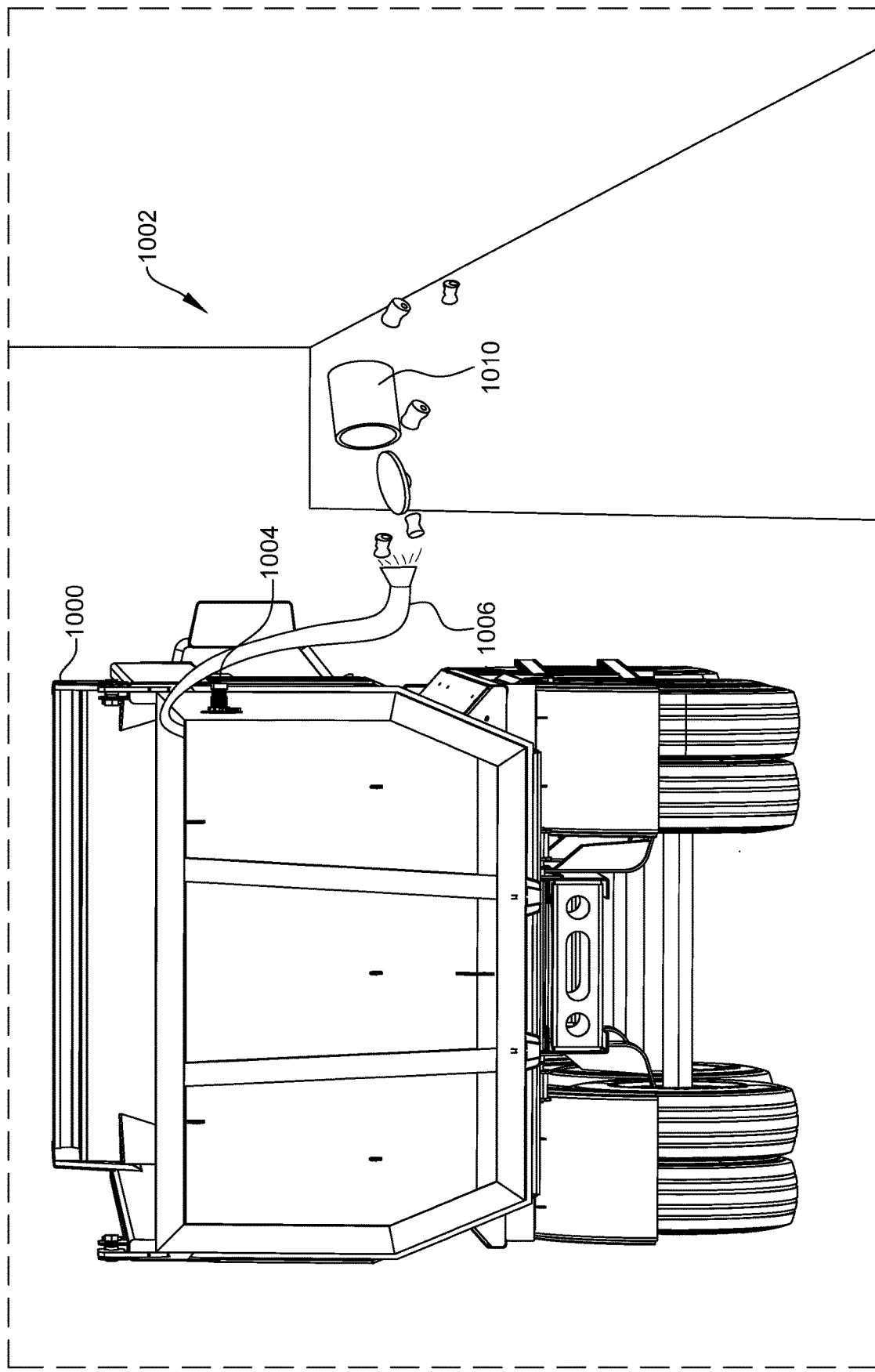
FIG. 10A illustrates a vehicle (autonomous) 1000 cleaning an area 1002, in accordance with at least one embodiment.
Figure 10B:
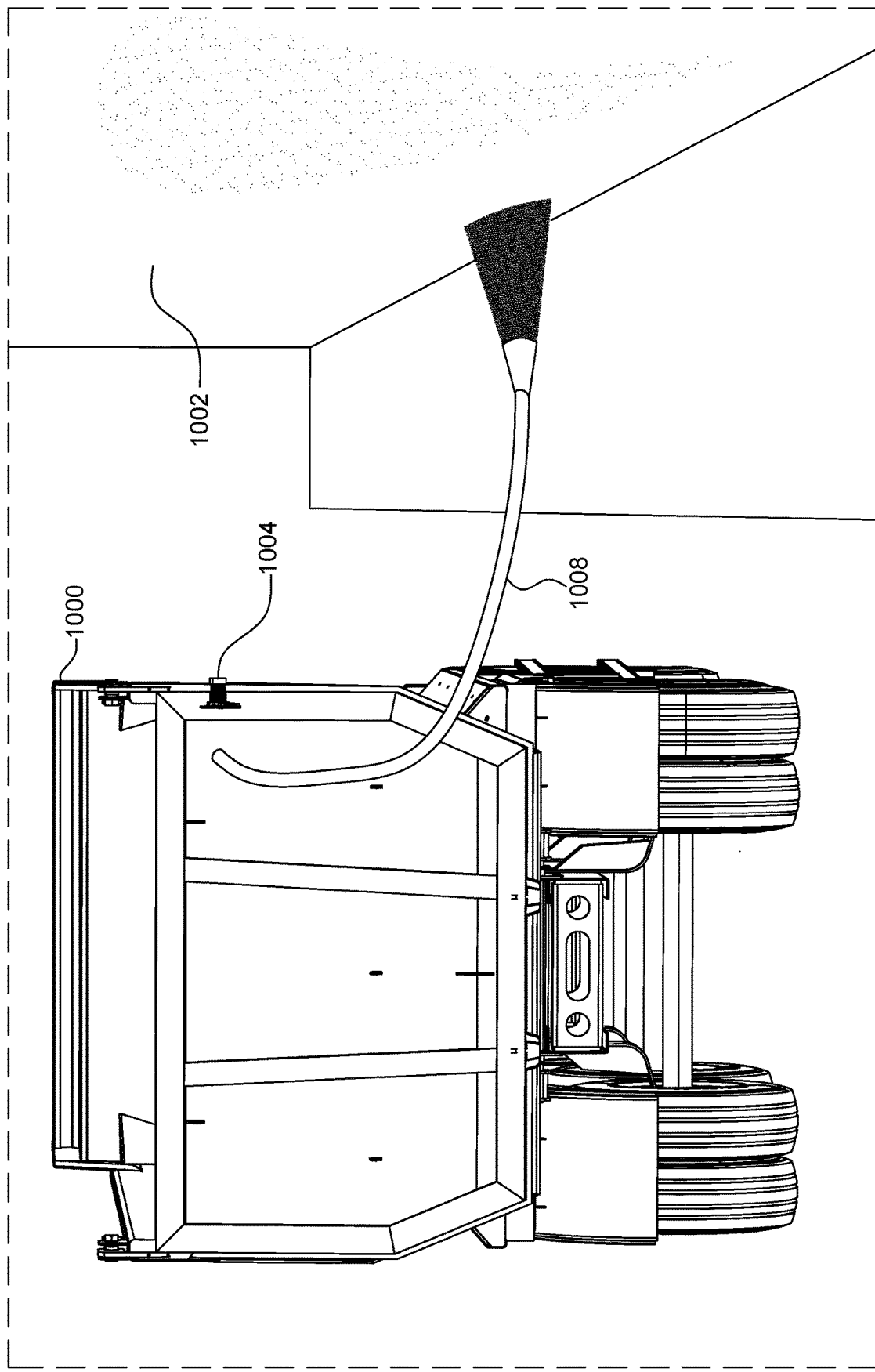
FIG. 10B illustrates a vehicle (autonomous) 1000 painting the area 1002, in accordance with at least one embodiment.

FIGS. 10A and 10B illustrate a vehicle (autonomous) 1000 for cleaning and painting an area 1002, in accordance with at least one embodiment.

The vehicle 1000 may include one or more cameras 1004, a vacuum cleaner 1006, and a spray nozzle 1008. At first, the vehicle 1000 may drive to various places for cleaning. Successively, the vehicle 1000 may automatically detect garbage 1010 in the area 1002. Successively, the vehicle 1000 may capture images of the area 1002. The images may correspond to the garbage 1010 present in the area 1002. It should be noted that the images may be captured using the one or more cameras 1004. In one embodiment, the images may be stored in a memory (not shown). Successively, the vehicle 1000 may send the captured images to a remote station (not shown). It should be noted that the remote station may compare the captured images with historical data corresponding to the area 1002. Successively, the vehicle 1000 may receive a command from the user for cleaning the area 1002. Thereafter, the vehicle 1000 may perform cleaning of the area 1002 using the vacuum cleaner 1006.

After cleaning the area 1002, the vehicle 1000 may perform painting on a portion of the area 1002. The vehicle 1000 may use the spray nozzle 1008 for spraying the paint, as shown in FIG. 10B. It should be noted that the paint may be supplied from the vehicle 1000. In one case, if the spray nozzle 1008 gets clogged, the vehicle 1000 may change the spray nozzle 1008 with the backup spray nozzles 1008 automatically. Such operation of the vehicle 1000 may be performed automatically for maintaining and preserving the aesthetics of the area 1002. It should be noted that the vehicle 1000 may include more than one spray nozzle 1008 as well, without departing from the scope of the disclosure.

Figure 11:
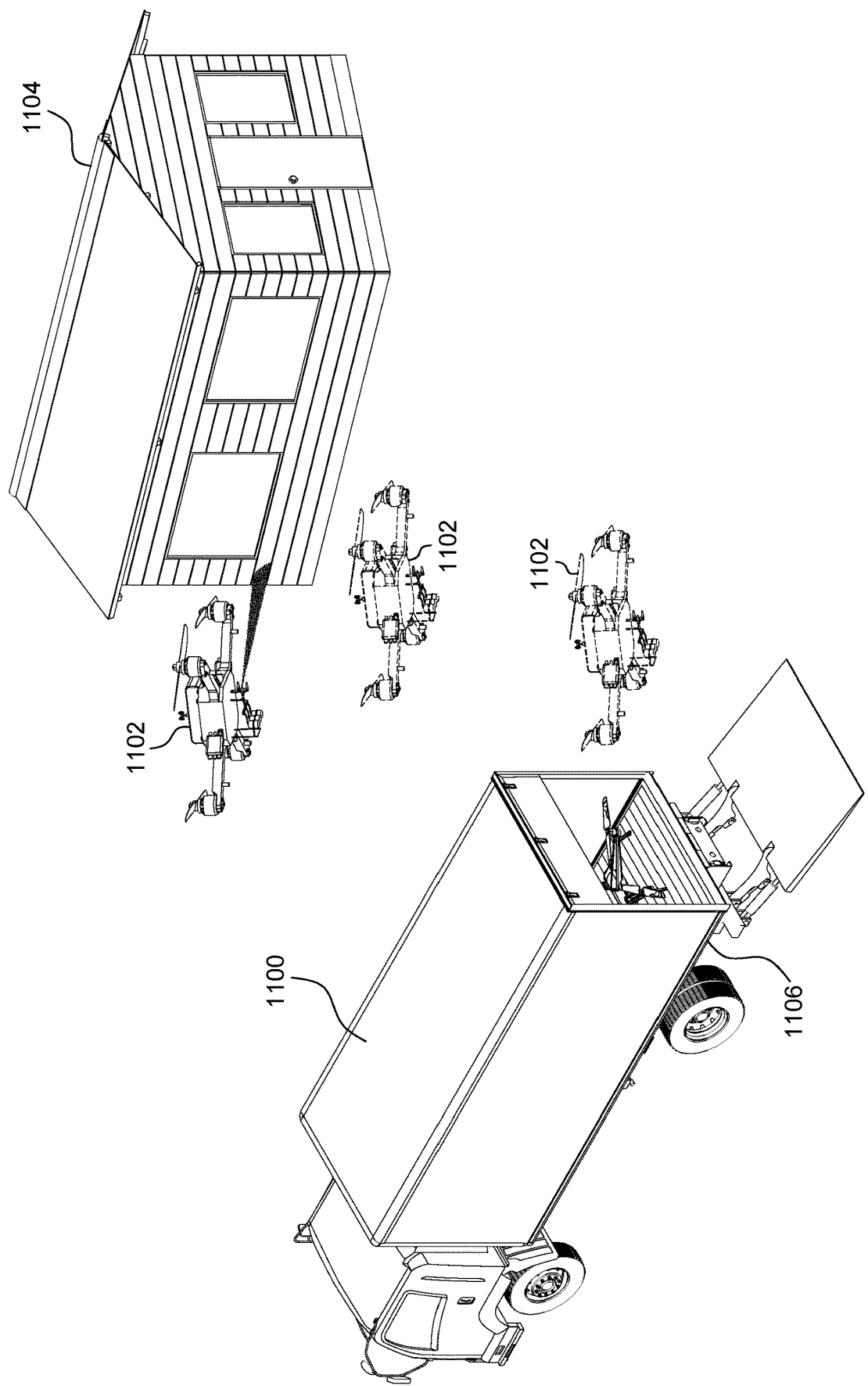
FIG. 11 illustrates a vehicle 1100 for deploying a drone 1102 to paint a house 1104, in accordance with at least one embodiment.

FIG. 11 illustrates a vehicle 1100 for deploying a drone 1102 to paint a house 1104, in accordance with at least one embodiment. The vehicle 1100 may correspond to a rentable self-service painting vehicle. Further, the vehicle 1100 may include a box 1106 that is used for storing the drone 1102. When the vehicle 1100 is used for painting the house 1104, the vehicle 1100 may drive to a home and deploy the drone 1102 automatically. In one case, the drone 1102 may correspond to a mobile rolling drone. Further, the drone 1102 may receive the paint from the vehicle 1100 via a tether (not shown) and may be powered by the vehicle 1100. In one embodiment, the vehicle 1100 may utilize the drone 1102 for detecting theft. It should be noted that the drone 1102 may include various components, such as a plurality of sensors, one or more cameras, a spray nozzle, and/or backup spray nozzles, as discussed above, without departing from the scope of the disclosure.

Figure 12:
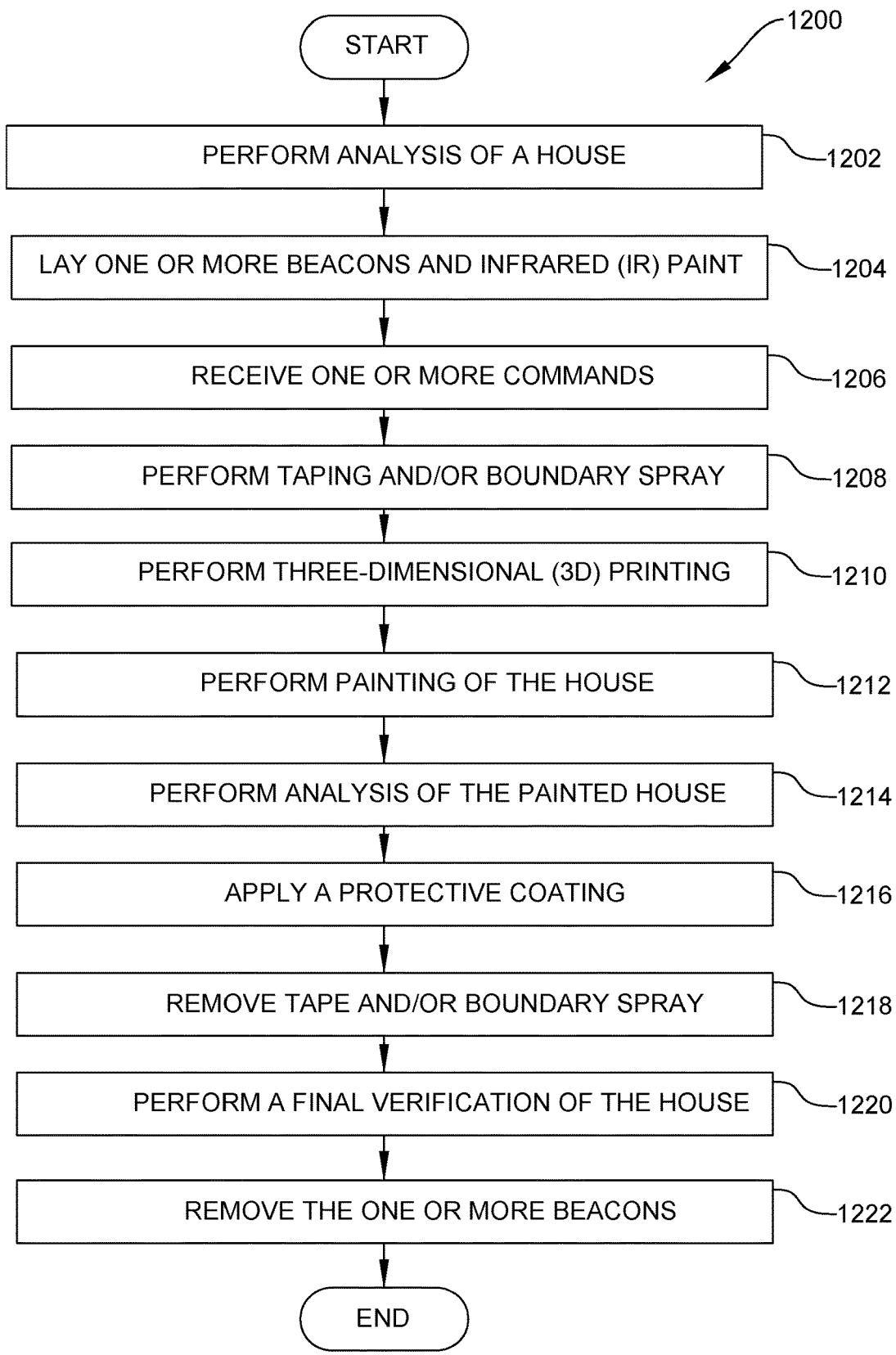
FIG. 12 illustrates a flowchart 1200 showing a method for painting the house, in accordance with at least one embodiment.

FIG. 12 illustrates a flowchart 1200 showing a method for painting the house, in accordance with at least one embodiment. The flowchart 1200 is described in conjunction with FIGS. 1 to 11.

At step 1202, an analysis of a house may be performed. The analysis may include capturing images of the house and/or three-dimensional (3D) measurements. In one embodiment, the analysis may be performed by the drone. In another embodiment, the analysis may be performed by the user (i.e., painter).

At step 1204, one or more beacons and Infrared (IR) paint may be laid. In one embodiment, the one or more beacons may be laid by the drone. In another embodiment, the IR paint may be laid by the painter.

At step 1206, one or more commands may be received. The one or more commands may be provided by the painter to the drone. The one or more commands may include, but are not limited to, performing painting using oil or latex paint, performing painting using different colors, and/or performing spray painting on a particular area of the house. In one embodiment, the painter may prepare a design on a computer and thereafter may provide the one or more commands to the drone.

At step 1208, taping and/or boundary spray may be performed. It should be noted that step 1208 may be performed by the drone.

At step 1210, three-dimensional (3D) printing may be performed. The 3D printing may include, but is not limited to, hole filling. Further, the drone may perform sanding to make the surface smooth. In one embodiment, the drone may deploy 3D scanning as well, without departing from the scope of the disclosure.

At step 1212, painting of the house may be performed. It should be noted that the drone may perform painting of the house.

At step 1214, an analysis of the painted house may be performed. The analysis may be performed by the user to determine how well the painting was executed. In one case, the user may give commands to the drone to do the painting using different brushes—e.g., using the paintbrush at the edges, etc.

At step 1216, a protective coating may be applied. In one case, the protective coating may correspond to ultraviolet (UV) protection coating.

At step 1218, tape and/or boundary spray may be removed. At step 1220, a final verification of the house may be performed by the user. At step 1222, the one or more beacons may be removed. It should be noted that the drone may remove the one or more beacons automatically after painting the house.

Figure 13:
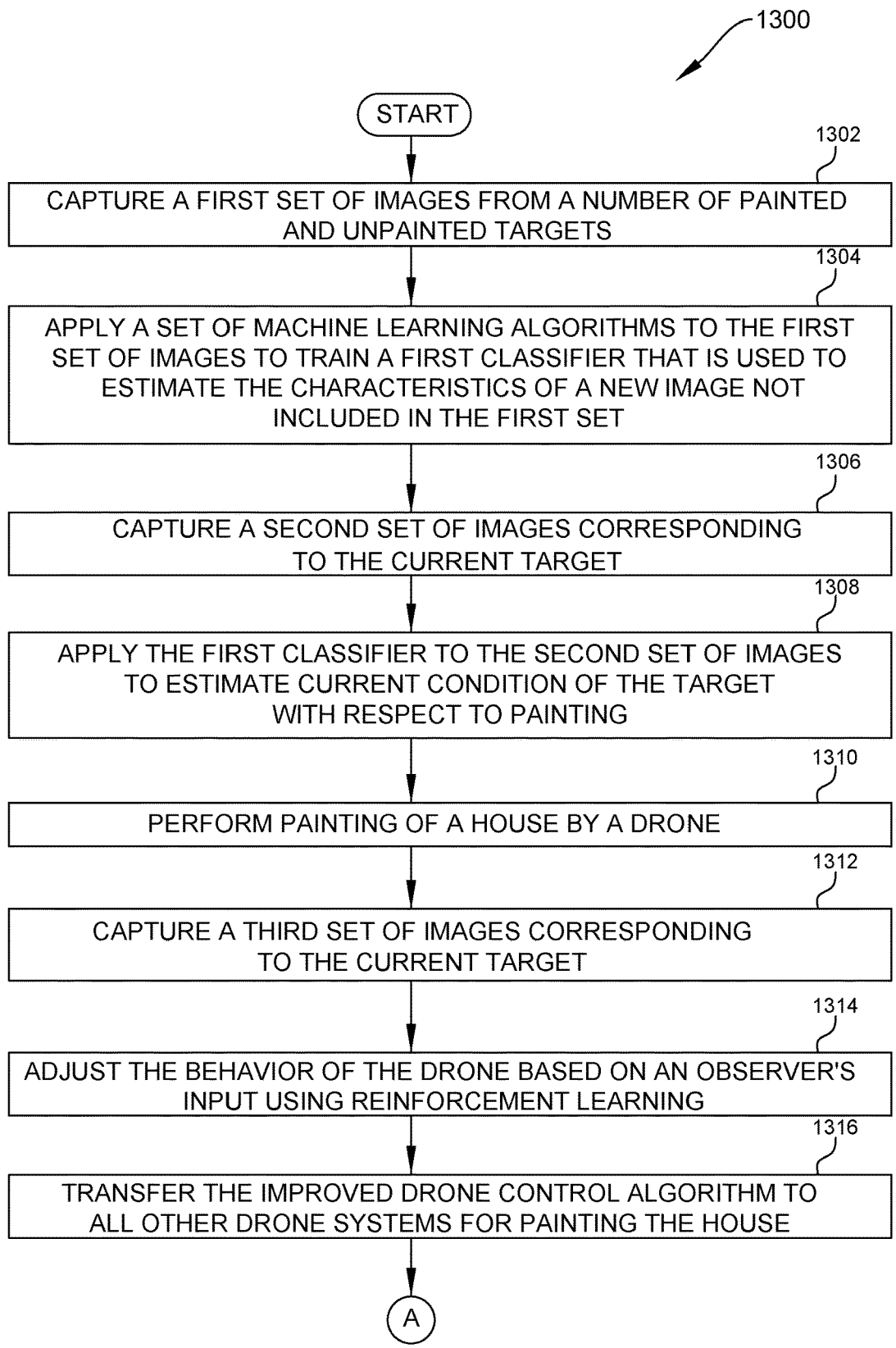
FIG. 13 illustrates a flowchart 1300 showing a method for painting the house using machine learning, in accordance with at least one embodiment.

FIG. 13 illustrates a flowchart 1300 showing a method for painting a target and improving results using machine learning, in accordance with at least one embodiment. The flowchart 1300 is described in conjunction with FIGS. 1 to 11. "Machine learning" here may comprise any number of machine learning or artificial intelligence technologies necessary to achieve the objectives of the invention, including, but not limited to, neural networks, convolutional neural networks, supervised learning, unsupervised learning, reinforcement learning, and deep learning.

At step 1302, a first set of images may be captured from a number of painted and unpainted targets. The first set of images may depict targets in a variety of conditions varying from poor to acceptable. Further, the first set of images may be taken under a variety of conditions such as rain, night, and/or day. Further, the first set of images may be captured at varying angles and distances. The first set of images may be stored for subsequent reference using some means such as, but not limited to, a database or other electronic data storage. Each image in the first set of images may be assigned a set of labels or tags indicating its characteristics. Such labels or tags may include such characteristics as "good," "poor," "incomplete," "old," "unpainted," etc., indicating the qualities of the paint applied.

At step 1304, a set of machine learning algorithms may be applied to the first set of images to train a first classifier that can be used to estimate the characteristics of a new image not included in the first set. Such use of machine learning would be well known to one skilled in the art.

At step 1306, a second set of images corresponding to the current target may be captured. The second set of images may be taken under a variety of conditions such as rain, night, and/or day. Further, the second set of images may be captured at varying angles and distances. The second set of images may be added to the first set of images for storage and subsequent reference.

At step 1308, the first classifier may be applied to the second set of images to estimate the current condition of the target with respect to painting. The estimated condition may be used to adjust the behavior of the drone in painting the target.

At step 1310, painting of the house may be performed by the drone.

At step 1312, a third set of images corresponding to the current target may be captured. The third set of images may be taken under a variety of conditions such as rain, night, and/or day. Further, the third set of images may be captured at varying angles and distances. The third set of images may be added to the first set of images for storage and subsequent reference.

At step 1314, an observer's input may be used to adjust the behavior of the drone using reinforcement learning. The observer may indicate whether the paint job was acceptable or unacceptable, possibly using a series of values on a gradient scale between the two. The observer's feedback may be indicated to the drone's control mechanism using an input channel such as a computer or mobile device. The drone's control mechanism may use the observer's feedback to adjust its control algorithm to do a better job of receiving positive observer feedback in subsequent painting, and thus to produce better execution of paint jobs.

At step 1316, the improved drone control algorithm may be transferred to all other drone systems and thus may be used for painting the house.

At step 1318, a set of machine learning algorithms may be applied to the first set of images, which may now include the second set of images and the third set of images, to train an improved second classifier that can be used to estimate the characteristics of a new image not included in the first set.

At step 1320, the improved second classifier may be transferred to all other drone systems and used for subsequent evaluation of targets before and after painting.

The disclosed embodiments encompass numerous advantages. Various embodiments of methods and systems for performing painting using drones have been disclosed. The disclosure provides the user with flexibility to remotely control the drone. Such operation may solve a problem of paint-matching a house by having all necessary paints and dyes in the system. Further, the disclosure discloses a rentable self-service painting vehicle that may drive to a home and paint a house by deploying a mobile rolling drone out of the vehicle that is powered by and supplied paint by the vehicle itself. Such a rentable self-service painting vehicle may solve a problem of a rentable automatic drone painting system for consumers that may be loaded into a vehicle. Also, such a rentable self-service painting vehicle may solve the problem of cleaning the rentable drone by the rental facility. In one embodiment, the drone may be used for replicating murals by providing accurate scanning of the murals and producing scaled replicas of the murals in other locations.

Further, the drone may put advertisements in mural form. Further, the disclosure discloses an autonomous vehicle that is used for cleaning an area and thereby preserving and maintaining aesthetics of the area. Further, the disclosure discloses that the autonomous vehicle may install one or more drones for detecting theft. Such a method and system for performing operations using the drones may reduce manpower, increasing efficiency and reliability.

The disclosed methods and systems, as illustrated in the foregoing description or any of its components, may be embodied in the form of a computer system. Typical examples of a computer system include a general-purpose computer, a programmed microprocessor, a microcontroller, a peripheral integrated circuit element, and other devices, or arrangements of devices that are capable of implementing the steps that constitute the method of the disclosure.

The computer system may comprise a computer, an input device, a display unit, and the internet. The computer may further comprise a microprocessor. The microprocessor may be connected to a communication bus. The computer may also include a memory. The memory may be random-access memory or read-only memory. The computer system may further comprise a storage device, which may be a hard disk drive or a removable storage device such as a floppy disk drive, an optical disk drive, an SD card, flash storage, or the like. The storage device may also be a means for loading computer programs or other instructions into the computer system. The computer system may also include a communication unit. The communication unit may allow the computer to connect to other computer systems and the Internet through an input/output (I/O) interface, allowing the transfer and reception of data to and from other systems. The communication unit may include a modem, an Ethernet card, or similar devices that enable the computer system to connect to networks such as LANs, MANs, WANs, and the Internet. The computer system facilitates input from a user through input devices accessible to the system through the I/O interface.

To process input data, the computer system may execute a set of instructions stored in one or more storage elements. The storage element(s) may also hold other data or information, as desired. Each storage element may be in the form of an information source or a physical memory element present in or connected to the processing machine.

The programmable or computer-readable instructions may include various commands that instruct the processing machine to perform specific tasks, such as steps that constitute the method of the disclosure. The systems and methods described can also be implemented using software alone, hardware alone, or a varying combination of the two. The disclosure is independent of the programming language and the operating system used by the computers. The instructions for the disclosure may be written in any programming language, including, but not limited to, assembly language or machine instructions, C, C++, Objective-C, Java, Swift, Python, and JavaScript. Further, software may be in the form of a collection of separate programs, a program module containing a larger program, or a portion of a program module, as discussed in the foregoing description. The software may also include modular programming in the form of object-oriented programming. The processing of input data by the processing machine may be in response to user commands, the results of previous processing, or a request made by another processing machine. The methods and systems of the disclosure may also be implemented using various operating systems and platforms, including, but not limited to, Unix, Linux, BSD, DOS, Windows, Android, iOS, Symbian, a real-time operating system, and a purpose-built operating system. The methods and systems of the disclosure may be implemented using no operating system as well. The programmable instructions may be stored and transmitted on a computer-readable medium. The disclosure may also be embodied in a computer program product comprising a computer-readable medium with any product capable of implementing the above methods and systems or the numerous possible variations thereof.

Various embodiments of the methods and systems for performing painting using drones and autonomous vehicle have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises," "comprising," "including," and "id est" should be interpreted as referring to elements, components, or steps in a non-exclusive manner, indicating that the referenced elements, components, or steps may be present, used, or combined with other elements, components, or steps that are not expressly referenced.

A person with ordinary skill in the art will appreciate that the systems, modules, and submodules have been illustrated and explained to serve as examples and should not be considered limiting in any manner. It will be further appreciated that the variants of the above disclosed system elements, modules, and other features and functions, or alternatives thereof, may be combined to create other, different systems or applications.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A system for performing painting using an unmanned aerial vehicle, the system comprising:
an unmanned aerial vehicle comprising a main body having a plurality of arms extending outward from the main body, a plurality of nozzles, a microprocessor, a comparator coupled to the microprocessor, a memory, a transceiver, at least one camera, a bump map sensor configured to determine texture, roughness and curvature of a surface of a building, at least one software module, a plurality of paint containers, an IR sensor configured to determine the wetness of paint, a spectroscopic sensor configured to analyze paint composition and application, a plurality of structured light emitters configured to test surface deformities, lidar, and a plurality of blades for flight, each of the plurality of blades positioned on a corresponding arm of the plurality of arms, wherein each of the plurality of paint containers is positioned on an underside of the main body away from the plurality of blades and in flow communication with a corresponding nozzle of the plurality of nozzles; and
a user computing device in communication with the unmanned aerial vehicle and comprising a software module to monitor usage;
wherein the comparator is configured to compare a first plurality of images taken by the at least one camera of the unmanned aerial vehicle before and a second plurality of images taken by the at least one camera of the unmanned aerial vehicle after a cleaning protocol of a building to be painted to ensure that the cleaning protocol achieves a desired result without damage;
wherein the at least one software module is configured to separate various layers of painting and create an additive layered painting plan, to make layers when a set of spot paints are used, and to predict a mixture of two thin colors and a result of the mixture of the two colors;
wherein the comparator is configured to detect the difference between dirt and an image through a particle detection or obstacle detection technique;
wherein the unmanned aerial vehicle is configured to paint a building using the plurality of nozzles and paint from the plurality of paint containers.

2. The system according to claim 1 further comprising at least one of an infrared sensor, an ultraviolet sensor, a speed and distance sensor, an image sensor, a chemical sensor or a spectroscopic sensor.

3. The system according to claim 1 further comprising a tether connected to the unmanned aerial vehicle and a ground station.

4. The system according to claim 1 wherein the memory of the unmanned aerial vehicle comprises a plurality of edge finding algorithms.

5. The system according to claim 1 further comprising a network.

6. The system according to claim 1 further comprising an image sensor configured to detect and convey information about what constitutes an image.

7. The system according to claim 1 further comprising a chemical sensor configured to detect chemicals present in an environmental situation, an industrial situation or an emergency response situation.

8. A system for performing painting using an unmanned aerial vehicle, the system comprising:
an unmanned aerial vehicle comprising a main body having a plurality of arms extending outward from the main body, a microprocessor, a plurality of nozzles, at least one camera, a bump map sensor configured to determine texture, roughness and curvature of a surface of the building, at least one software module, an IR sensor configured to determine the wetness of paint, a spectroscopic sensor configured to analyze paint composition and application, a plurality of structured light emitters configured to test surface deformities, lidar, and a plurality of blades, each of the plurality of blades positioned on a corresponding arm of the plurality of arms;
a reservoir containing a plurality of different colors of paint;
a plurality of hoses, each hose connected to a corresponding nozzle of the plurality of nozzles and the reservoir; and
a user computing device;
wherein the at least one software module is configured to separate various layers of painting and create an additive layered painting plan, to make layers when a set of spot paints are used, and to predict a mixture of two thin colors and a result of the mixture of the two colors;

wherein the microprocessor of the unmanned aerial vehicle is configured to receive data from the at least one software module for a paint protocol for painting the building using the plurality of nozzles and paint from the reservoir via the plurality of hoses.

9. The system according to claim 8 further comprising an image sensor configured to detect and convey information about what constitutes an image.

10. The system according to claim 8 further comprising a chemical sensor configured to detect chemicals present in an environmental situation, an industrial situation or an emergency response situation.

11. The system according to claim 8 wherein the unmanned aerial vehicle further comprises a microprocessor, a comparator coupled to the microprocessor, a memory, and a transceiver, wherein the comparator is configured to compare a plurality of images taken before and after a cleaning protocol of a building to be painted to ensure that the cleaning protocol achieves a desired result without damage, and wherein the comparator is configured to detect the difference between dirt and an image through a particle detection or obstacle detection technique.

\* \* \* \* \*